(12) United States Patent
Wolf et al.

(10) Patent No.: US 6,198,275 B1
(45) Date of Patent: Mar. 6, 2001

(54) ELECTRONIC CIRCUIT FOR AUTOMATIC DC OFFSET COMPENSATION FOR A LINEAR DISPLACEMENT SENSOR

(75) Inventors: Ronald J. Wolf; Martin James Lynch, both of Elkhart, IN (US)

(73) Assignee: American Electronic Components, Elkhart, IN (US)

( * ) Notice: Subject to any disclaimer, the term of this patent is extended or adjusted under 35 U.S.C. 154(b) by 0 days.

(21) Appl. No.: 09/003,774

(22) Filed: Jan. 7, 1998

Related U.S. Application Data

(63) Continuation-in-part of application No. 08/486,650, filed on Jun. 7, 1995, now Pat. No. 5,757,181.

(51) Int. Cl.[7] .............................. G01B 7/00; G01R 33/025
(52) U.S. Cl. ........................ 324/207.12; 324/225; 702/94
(58) Field of Search ............................... 324/207.12, 225, 324/207.2; 338/32 H; 327/509, 510, 511; 702/85, 94, 104

(56) References Cited

U.S. PATENT DOCUMENTS

| | | |
|---|---|---|
| 2,942,177 | 6/1960 | Neumann et al. . |
| 2,992,369 | 7/1961 | LaRocca . |
| 3,060,370 | 10/1962 | Varterasian . |
| 3,112,464 | 11/1963 | Ratajski et al. . |
| 3,118,108 | 1/1964 | Zoss . |
| 3,185,920 | 5/1965 | Brunner . |
| 3,473,109 | 10/1969 | Maaz et al. . |
| 3,482,163 | 12/1969 | Peek et al. . |
| 3,818,292 | 6/1974 | Berman . |
| 3,988,710 | 10/1976 | Sidor et al. . |
| 4,066,962 | 1/1978 | Jaffe . |
| 4,074,186 * | 2/1978 | Flaherty .............................. 324/225 |
| 4,086,533 | 4/1978 | Ricouard et al. . |
| 4,107,604 | 8/1978 | Bernier . |
| 4,156,191 | 5/1979 | Knight et al. . |
| 4,293,814 | 10/1981 | Boyer . |
| 4,293,837 | 10/1981 | Jaffe et al. . |
| 4,371,837 * | 2/1983 | Sieverin .............................. 324/225 |
| 4,377,088 | 3/1983 | Evert . |

(List continued on next page.)

FOREIGN PATENT DOCUMENTS

| | | |
|---|---|---|
| 31 50 013 | 6/1983 | (DE) . |
| 4 014 885 | 11/1990 | (DE) . |
| 296 22 602 U | 4/1997 | (DE) . |
| 0 053 938 | 6/1982 | (EP) . |
| 0 363 738 | 9/1989 | (EP) . |
| 0 0780592 | 12/1995 | (EP) . |
| 1 416 925 | 12/1975 | (GB) . |
| 2 221 039 | 1/1990 | (GB) . |
| 2 251 948 | 7/1992 | (GB) . |
| 2 297 622 | 8/1996 | (GB) . |
| 56 107 119 | 8/1981 | (JP) . |
| 82 03121 | 9/1982 | (WO) . |
| WO 88/07172 | 9/1988 | (WO) . |
| WO 94/12940 | 6/1994 | (WO) . |

OTHER PUBLICATIONS

A Smart Pressure Sensor with On–Chip Calibration and Compensation Capability by E. Obermeier et al., *Sensors*, Mar., 1995, pp. 20, 21, 52 and 53.

Ravi, Vig, "Power Hall–Effect Sensor Take to the Road," *Machine Design*, Aug. 23, 1990, pp. 113–119.

*Primary Examiner*—Walter E. Snow
(74) *Attorney, Agent, or Firm*—Katten Muchin Zavis

(57) ABSTRACT

An electronic circuit for automatically compensating for errors in the output signal of a displacement sensor. The electronic circuitry includes an analog to digital converter for converting an analog output signal from a linear displacement type sensor. The digital output signal from the sensor is processed by a microcontroller which automatically compensates for errors in the output signal. Ideal values, stored in an electronic memory, are used for compensation.

11 Claims, 18 Drawing Sheets

U.S. PATENT DOCUMENTS

| | | |
|---|---|---|
| 4,392,375 | 7/1983 | Eguchi et al. . |
| 4,524,932 | 6/1985 | Bodziak . |
| 4,570,118 | 2/1986 | Tomczak et al. . |
| 4,731,579 | 3/1988 | Peterson et al. . |
| 4,745,363 | 5/1988 | Carr et al. . |
| 4,771,237 | 9/1988 | Daley . |
| 4,798,920 | 1/1989 | Makino et al. . |
| 4,829,248 | 5/1989 | Loubier . |
| 4,857,842 | 8/1989 | Sturman et al. . |
| 4,873,655 | 10/1989 | Kondraske . |
| 4,893,502 | 1/1990 | Kubota et al. . |
| 4,922,197 | 5/1990 | Juds . |
| 4,970,463 | 11/1990 | Wolf et al. . |
| 4,992,731 | 2/1991 | Lorenzen . |
| 5,045,920 | 9/1991 | Vig et al. . |
| 5,087,879 | 2/1992 | Sugifune et al. . |
| 5,144,231 * | 9/1992 | Tenebaum et al. .................. 324/225 |
| 5,144,233 | 9/1992 | Christenson et al. . |
| 5,159,268 | 10/1992 | Wu . |
| 5,164,668 | 11/1992 | Alfors . |
| 5,274,328 | 12/1993 | Begin et al. . |
| 5,283,521 * | 2/1994 | Ottesen et al. ........................ 324/225 |
| 5,285,154 | 2/1994 | Burreson . |
| 5,305,241 * | 4/1994 | Hayashi et al. ......................... 702/94 |
| 5,311,124 | 5/1994 | Hubbard et al. . |
| 5,332,965 | 7/1994 | Wolf et al. . |
| 5,341,097 | 8/1994 | Wu . |
| 5,351,003 | 9/1994 | Bauer et al. . |
| 5,363,361 | 11/1994 | Bakx . |
| 5,369,361 | 11/1994 | Wada . |
| 5,389,889 | 2/1995 | Towne et al. . |
| 5,406,200 | 4/1995 | Begin et al. . |
| 5,497,081 | 3/1996 | Wolf . |
| 5,650,719 | 7/1997 | Moody et al. . |
| 5,694,038 | 12/1997 | Moody et al. . |
| 5,729,130 | 3/1998 | Moody et al. . |
| 5,757,181 * | 5/1998 | Wolf et al. ....................... 324/207.12 |

* cited by examiner

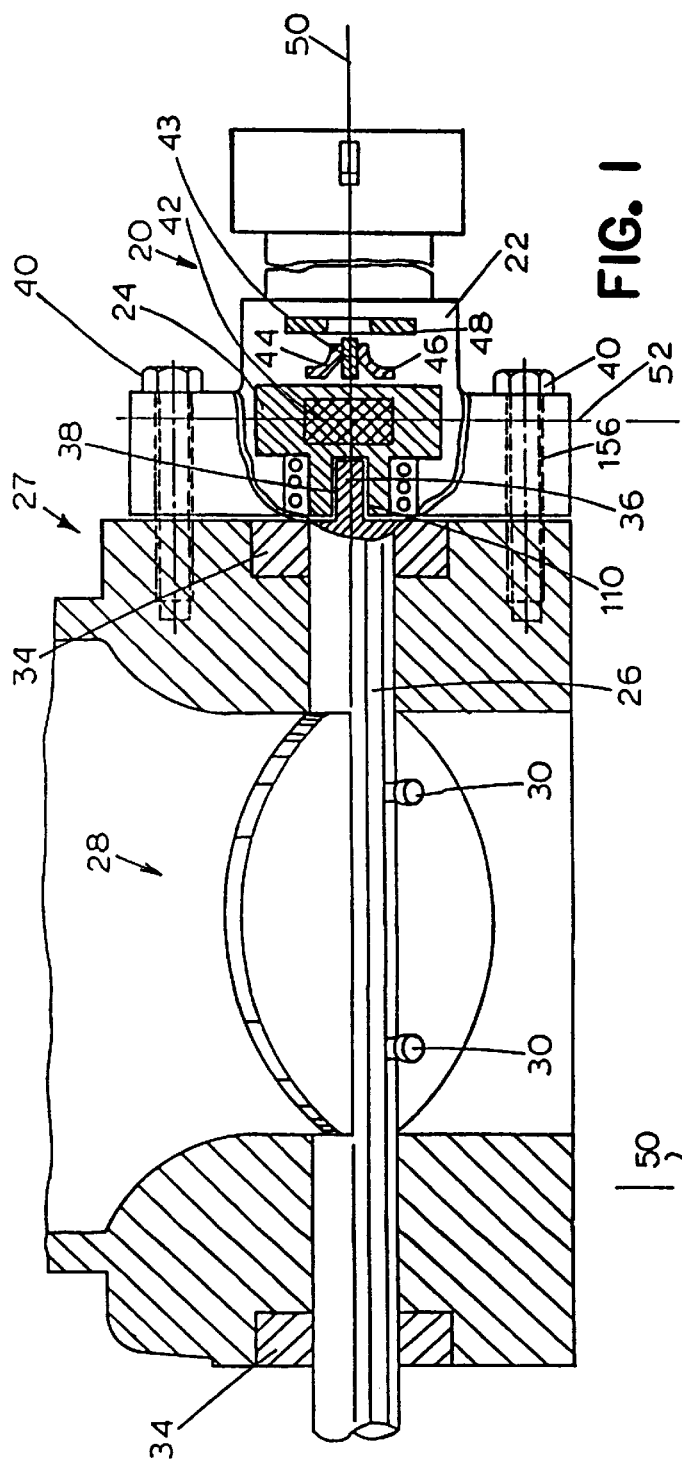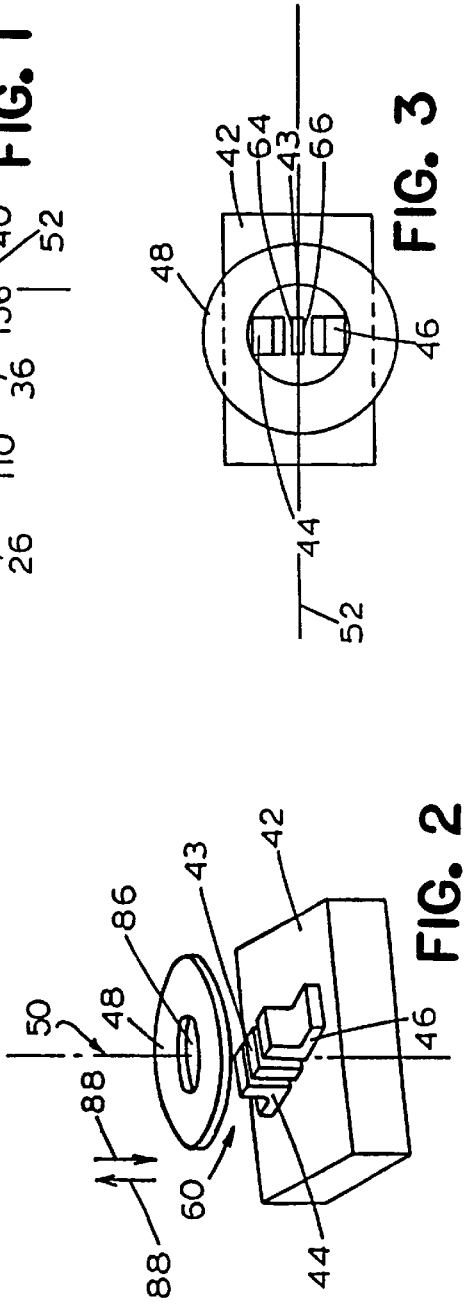

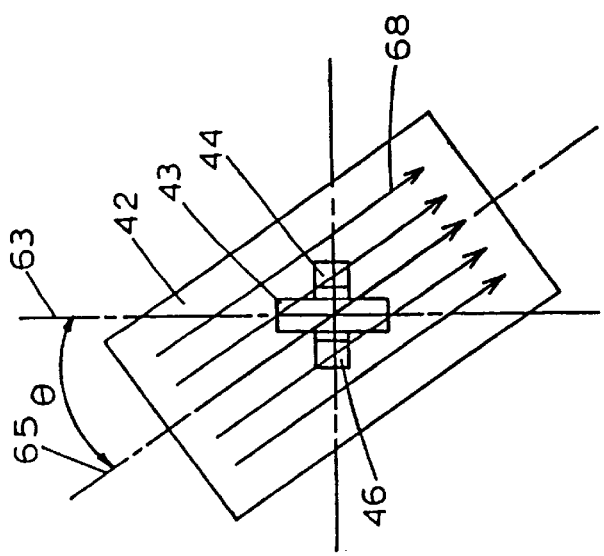
FIG. 4
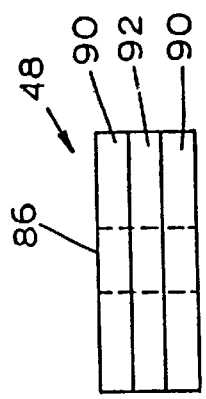
FIG. 8
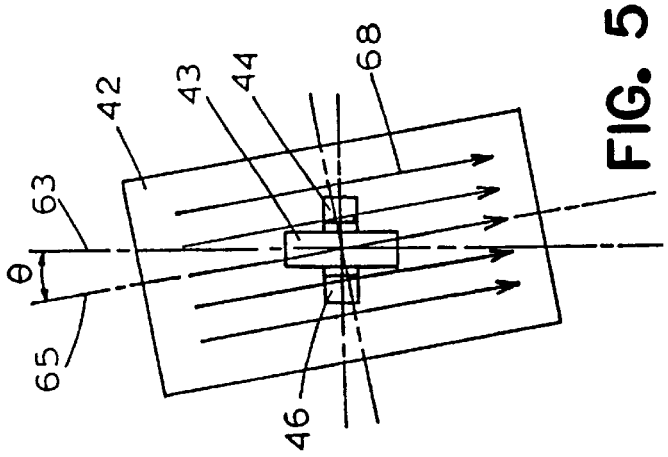
FIG. 5
FIG. 6
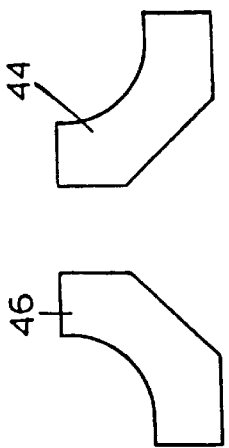
FIG. 9
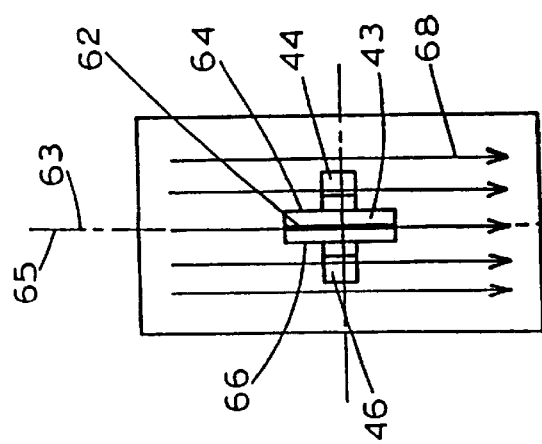
FIG. 10

|  | CALIBRATION ANGLE | MEASURED | IDEAL | M | B |  |
|---|---|---|---|---|---|---|
| $\theta_0$ | 14.4 | 1.170 | 0.825 |  |  |  |
| $\theta_1$ | 17.4 | 1.262 | 0.965 | 1.522 | −.955 |  |
| $\theta_2$ | 20.4 | 1.358 | 1.104 | 1.448 | −.862 |  |
| $\theta_3$ | 34.8 | 1.856 | 1.774 | 1.345 | −.722 |  |
| $\theta_4$ | 49.2 | 2.418 | 2.444 | 1.192 | −.438 |  |
| $\theta_5$ | 63.6 | 3.030 | 3.113 | 1.053 | −.199 |  |
| $\theta_6$ | 78.0 | 3.561 | 3.783 | 1.267 | −.710 |  |
| $\theta_7$ | 92.4 | 4.037 | 4.452 | 1.405 | −1.220 |  |

ELECTRONIC CIRCUIT FOR AUTOMATIC DC OFFSET COMPENSATION FOR A LINEAR DISPLACEMENT SENSOR

CROSS-REFERENCE TO RELATED APPLICATIONS

This application is a continuation-in-part application of commonly owned patent application Ser. No. 08/486,650, filed on Jun. 7, 1995, now U.S. Pat. No. 5,757,181.

MICROFICHE APPENDIX

This application includes a microfiche appendix consisting of two microfiche having total of 111 frames.

BACKGROUND OF THE INVENTION

1. Field of the Invention

The present invention relates to an automatic compensation circuit for use with a linear displacement type sensor which dynamically compensates for errors in the sensor output signal based upon ideal values stored in electronic memory.

2. Description of the Prior Art

Various linear type displacement sensors, such as angular position sensors, are known to be used for various purposes including throttle position sensors for determining the angular position of a butterfly valve in a throttle body. Examples of such sensors are disclosed in U.S. Pat. Nos. 4,893,502 and 5,332,965. Such sensors are generally used to control the amount of fuel applied to the combustion chamber of an internal combustion engine.

Such throttle position sensors, such as the sensors disclosed in U.S. Pat. Nos. 4,893,502 and 5,332,956, are typically subject to part-to-part variations which require each and every sensor to be calibrated either by the throttle body manufacturer as in the case of U.S. Pat. No. 4,893,502 or the sensor manufacturer as in the case of U.S. Pat. No. 5,332,965. In the embodiment disclosed in the '502 patent, a circular magnet is rigidly secured directly to the butterfly valve shaft. A magnetic resistive element (MRE) is disposed within a modified throttle body at a fixed air gap relative to the circular magnet. An amplifying circuit with variable gain is used to calibrate the sensor by way of potentiometers or variable resistors.

As is known in the art, the output of such potentiometers may vary with temperature or time. Due to the relatively wide operating temperature range of such a sensor used in an internal combustion engine environment, such potentiometers will drift and affect the overall calibration of the device. The sensor disclosed in the '965 patent is mechanically adjusted; and thus, the calibration is not subject to drift as in the case of the '502 patent. However, such mechanical adjustments are time-consuming and cumbersome, which increases the overall labor cost to manufacture the product.

SUMMARY OF THE INVENTION

It is an object of the present invention to solve various known problems in the prior art.

It is yet another object of the present invention to provide circuitry for automatically compensating for errors in the output signal of a linear type displacement signal.

Briefly, the present invention relates to electronic circuitry for automatically compensating for errors in the output signal of a displacement sensor. The electronic circuitry includes an analog to digital converter (ADC) for digitizing an analog output signal from a linear displacement type sensor. The digitized output signal from the (ADC) is processed by a microcontroller to automatically compensate for errors in the output signal. Ideal values, stored in an electronic memory, are used for compensation.

BRIEF DESCRIPTION OF THE DRAWING

These and other objects of the present invention will be readily understood with reference to the specification and the following drawing, wherein:

FIG. 1 is a sectional view, partially broken away, of a throttle body with an angular position sensor in accordance with the present invention attached thereto;

FIG. 2 is a simplified perspective view of the angular position sensor in accordance with the present invention;

FIG. 3 is a plan view of the angular position a sensor illustrated in FIG. 2;

FIG. 4 is a simplified plan view of the angular position sensor in accordance with the present invention illustrating the relationship between the angular position sensor and the magnetic flux in a static position;

FIGS. 5 and 6 are similar to FIG. 4 and illustrate the relationship between the angular position sensor and the magnetic flux in various operating positions;

FIG. 8 is a perspective view of a pair of flux concentrators which form a portion of the present invention;

FIG. 9 is an elevational view of an alternate embodiment of the flux concentrators illustrated in FIG. 8;

FIG. 10 is an elevational view of a halo-shaped flux concentrator which forms a portion of the present invention;

DETAILED DESCRIPTION OF THE PREFERRED EMBODIMENT

Figure 30:
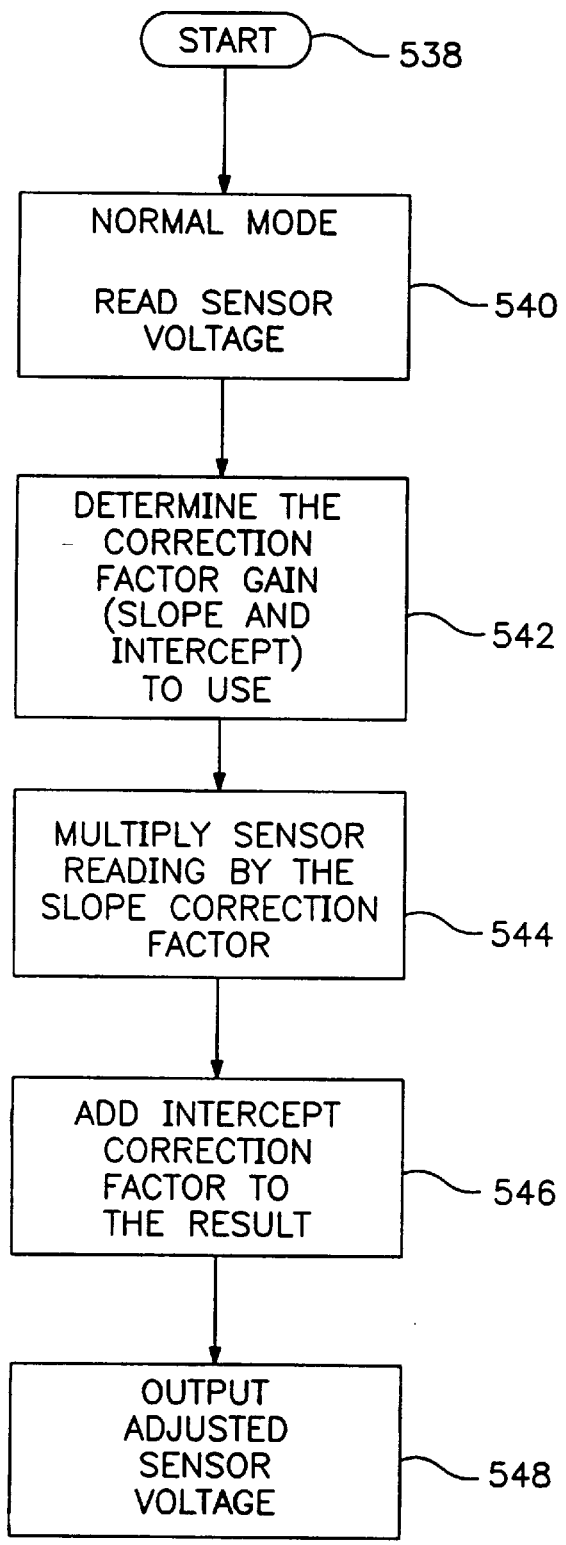
Figure 31:
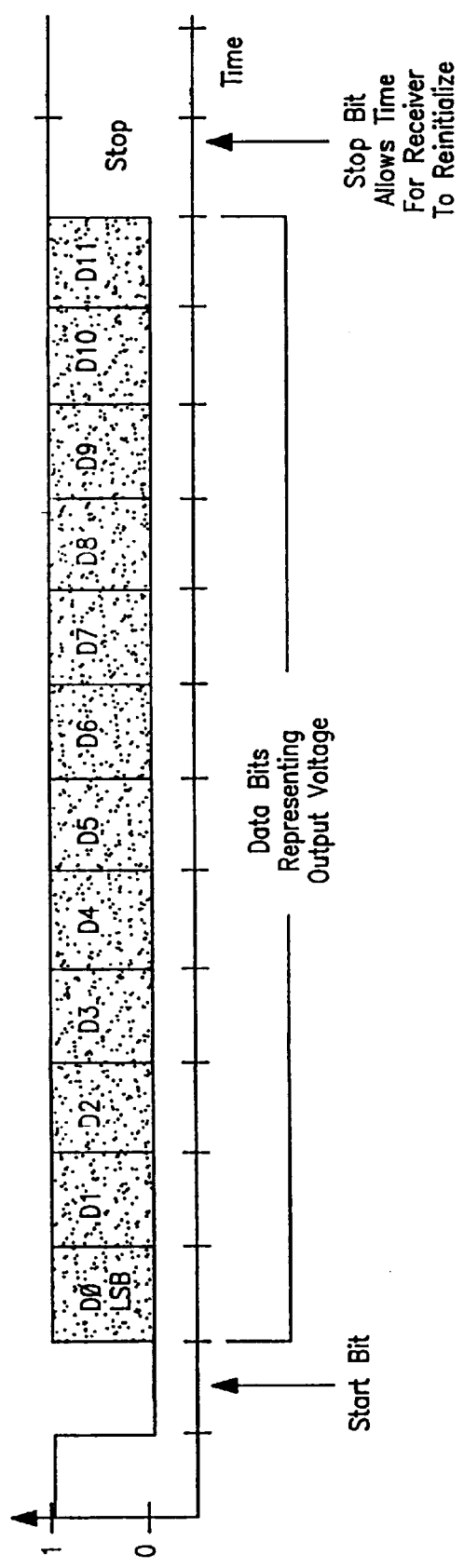
FIG. 31 is a block diagram of a communication protocol for use with a digital embodiment of the circuitry illustrated in FIG. 18.

FIGS. 1–17 and the description that follows relate to an angular position sensor which can be adjusted mechanically. FIGS. 18–31, relate to electronic circuitry for automatically compensating for errors in the output signal of a linear displacement type sensor, such as an angular position sensor and generating a compensates sensor analog output signal. FIG. 31 is a graphical illustration of the protocol of an asynchronous serial data message for providing a compensated senor digital output signal.

MECHANICALLY ADJUSTABLE ANGULAR POSITION SENSOR

Referring first to FIGS. 1–17, an angular position sensor 20 is adapted to be adjusted mechanically which eliminates the need for potentiometers and the like, used to calibrate known angular position sensors, such as the angular position sensor disclosed in U.S. Pat. No. 4,893,502. As discussed above, such potentiometers and the like are temperature dependent. Thus, in relatively hostile temperature environments, the calibration of such sensors is affected.

As will be appreciated by those of ordinary skill in the art, the angular position sensor 20 is adapted to be used in various applications for providing a signal representative of the angular position of a pivotally mounted device. The angular position sensor 20 is illustrated and discussed below in an application as a throttle position sensor. However, it should be appreciated by those of ordinary skill in the art that the application of the angular position sensor 20 in accordance with the present invention is also useful for various other applications.

With reference to FIG. 1, the angular position sensor 20 is disposed in its own housing 22 and includes a drive arm 24, rotatably mounted relative to the housing 22, that enables the sensor 20 to be mechanically coupled to an output shaft of a pivotally mounted device. In an application, such as a throttle position sensor, the drive arm 24 is mechanically coupled to a butterfly valve shaft 26 carried by a throttle body 27. More particularly, in such an application, a butterfly valve 28 is rigidly affixed to the rotatably mounted shaft 26 with suitable fasteners 30 or by spot welding. The shaft 26 is rotatably mounted relative to a throttle body 27 with suitable bearings 34.

The butterfly valve 28 is formed to close or throttle the air flow to an internal combustion engine (not shown). By coupling the angular position sensor 20 to the butterfly valve shaft 26, the angular position sensor 20 is adapted to provide a signal representative of the angular position of the butterfly valve 28 for use in controlling the amount of fuel applied to the combustion chamber in an internal combustion engine.

It is contemplated that the shaft 26 and the drive arm 24 be prevented from rotating relative to each other. Various means can be used for preventing such rotation; all of which are intended to be included within the broad scope of the invention. As shown, the butterfly valve shaft 26 is formed with a reduced cross-sectional area portion or tongue 36 which extends outwardly from one side of a throttle body 27 to allow engagement with the drive arm 24. In order to prevent the rotation of the tongue 36 relative to the drive arm 24, the tongue 36 may be formed with a non-circular cross-section that is adapted to mate with a cooperating recess 38 formed in the drive arm 24.

Another important aspect of the angular position sensor 20 is that it is formed as a separate unit that is adapted to rather quickly and easily be secured to, for example, the throttle body 27 by way of suitable fasteners 40. By providing the angular position sensor 20 as a separate unit, the calibration of the sensor 20 can be done at the factory by the sensor manufacturer. In contrast, some known angular position sensors are incorporated directly into the throttle body, for example, as disclosed in U.S. Pat. No. 4,893,502. In such an embodiment, calibration of the sensor is normally done by the throttle body manufacturer whose experience with such sensors is admittedly less than the sensor manufacturer.

FIGS. 2 and 3 illustrate the basic principles of the angular position sensor 20 in accordance with the present invention. In particular, the angular position sensor 20 includes a magnet 42, preferably a standard bar-shaped magnet defining opposing North and South magnetic poles, a magnetic sensing element 43, a pair of generally L-shaped flux concentrators 44 and 46 and an additional flux concentrator 48, used for adjustment. As will be discussed in more detail below, the magnet 42 is adapted to be mounted in the drive arm 24 for rotation about an axis 50 (FIG. 1) that is generally perpendicular to a magnetic axis 52 which interconnects the opposing North and South magnetic poles, as shown in FIG. 1. As will be discussed in more detail below, the magnet 42 is mounted within the drive arm 24 such that the axis of rotation 50 of the magnet is coaxial with the butterfly valve shaft 26 and generally perpendicular to the magnetic axis 52 such that rotation of the butterfly valve shaft 26 causes rotation of the magnet 42 about the axis 50 by a corresponding amount.

The magnetic sensing element 43 is preferably a Hall effect IC with on-chip amplifier circuits, for example, an Allegro Model No. 3506. Since the angular position sensor 20 is adjusted mechanically, there is no need for external circuitry for electrically adjusting the sensor 20. As such, the output of the magnetic sensing device 43 is adapted to be directly coupled to the fuel control circuit (not shown) for the internal combustion engine. By eliminating the need for external potentiometers or variable resistors, the need for conductive tracings on a printed circuit board to connect the magnetic sensing device 43 to such external potentiometers or variable resistors is eliminated. As mentioned above, the conductive tracings in such an application can act as antennas and thus subject the sensor to various electromagnetic interference. In sensors which incorporate such external potentiometers or variable resistors for adjustment, for example, as disclosed in U.S. Pat. No. 4,893,502, the circuitry must be shielded against electromagnetic interferences which adds to the cost of the sensor. Such external potentiometers or variable resistors are also affected by temperature. Thus, in a relatively hostile environment, such as an under-hood environment of an internal combustion engine, the calibration drifts with temperature change. The angular position sensor 20 in accordance with the present invention solves these problems by using a mechanical adjustment for the sensor which eliminates the need for external potentiometers and the like.

Figure 13:
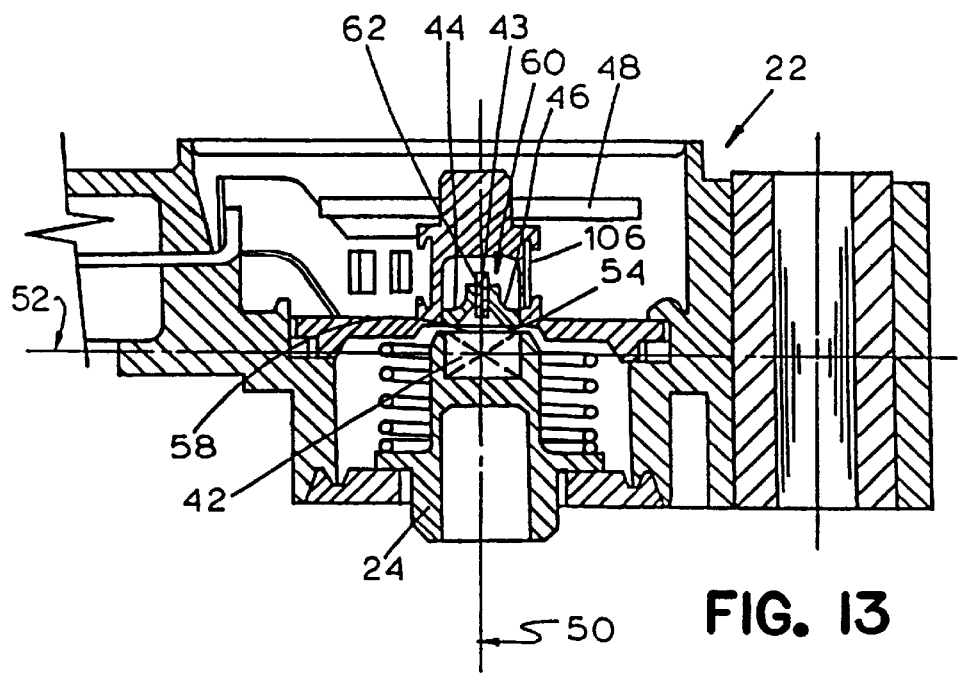
FIG. 13 is a cross-sectional view of an angular position sensor incorporating the carrier assembly illustrated in FIGS. 11 and 12.

As best shown in FIG. 13, the magnetic sensing element 43 is mounted stationary relative to the housing 22 at a fixed air gap 54 relative to a surface 58 of the magnet 42 that is generally parallel to the magnetic axis 52. The generally L-shaped flux concentrators 44 and 46 are rigidly disposed relative to the magnetic sensing device 43 forming an assembly 60. In particular, the magnetic sensing device 43 is sandwiched between the generally L-shaped flux concentrators 44 and 46 to form the assembly 60. The assembly 60 is disposed such that a sensing plane 62, defined by the magnetic sensing element 43, is generally parallel to the axis of rotation 50 of the magnet 42. As shown, a Hall effect IC is used as the magnetic sensing element 43. In such an embodiment, the sensing plane 62 is defined as a plane generally parallel to opposing surfaces 64 and 66, shown in FIG. 4.

As shown in FIG. 2, the assembly 60 is disposed such that the axis of rotation 50 of the magnet 42 is through the midpoint of the magnetic sensing device 43 and parallel to the sensing plane 62. However, it is also contemplated that the assembly 60 can be disposed such that the axis of rotation 50 is offset from the midpoint of the magnetic sensing element 43 along an axis generally parallel to the sensing plane 62.

As shown in FIG. 4, the angular position sensor 20 is in a quiescent state. In this state the magnetic flux density B, represented by the arrows identified with the reference numeral 68, is generally parallel to the sensing plane 62 of the magnetic sensing device 43. In this state the magnetic sensing element 43 outputs a quiescent voltage. For an Allegro Model No. 3506 Hall effect IC, the quiescent output voltage is typically about 2.5 volts DC. Rotating the magnet 42 counterclockwise as shown in FIGS. 5 or 6 or clockwise (not shown) causes an ever increasing amount of magnetic flux density 68 to be applied to the sensing plane 62 of the magnetic sensing element 43 to vary the output voltage of the magnetic sensing element 43 as a function of an angle θ defined between an axis 63 parallel to the sensing plane 62 and an axis 65. For an Allegro Model No. 3506, the output voltage swing is approximately ±2.0 volt DC depending on the direction of the angular rotation.

In accordance with an important aspect of the invention, the relationship between the axes 63 and 65 can be varied in order to adjust the offset voltage of the sensor 20. In particular, the assembly 60 is rotated relative to the magnet 42 in a quiescent state to adjust the sensor offset voltage. In such an application, the sensor would be configured in the quiescent state to have a small angle θ between the axes 63 and 65 as illustrated in FIG. 4.

Figure 7:
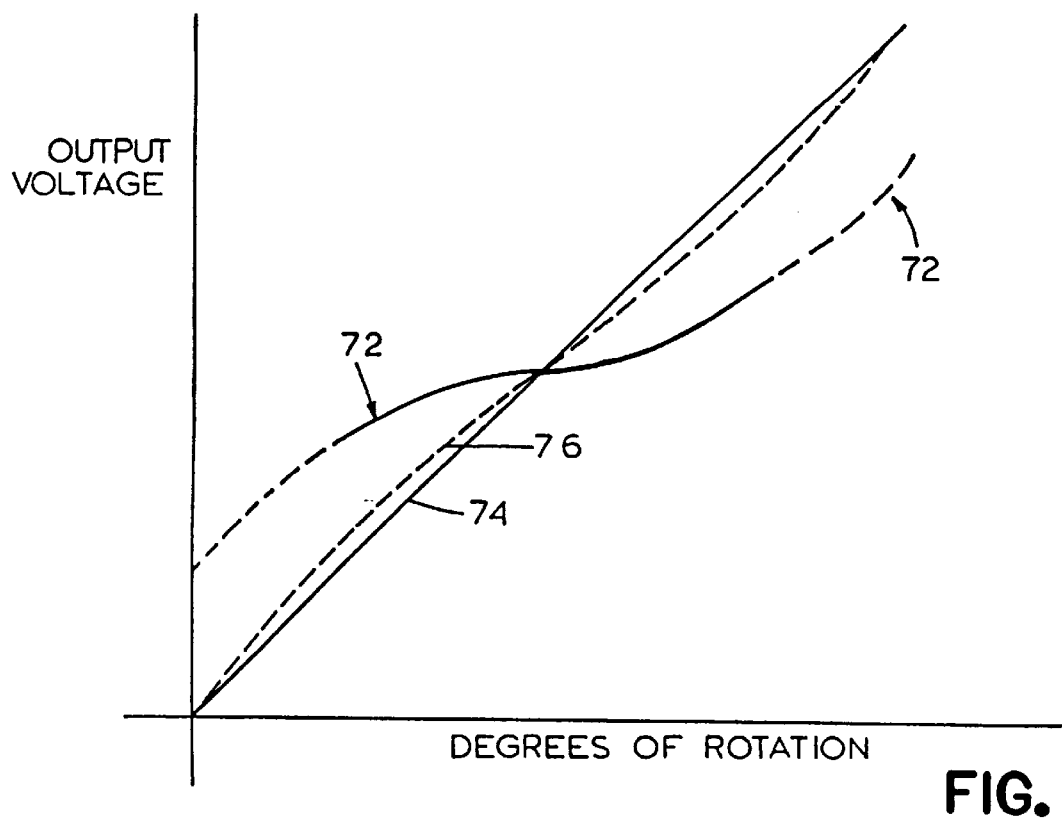
FIG. 7 is an exemplary graph illustrating the relationship between the output voltage of the angular position sensor versus degrees of rotation shown in dotted line with a superimposed curve which illustrates the effects of the flux concentrators in accordance with the present invention.

As will be discussed in more detail below, an important aspect of the invention relates to the fact that the output voltage of the angular position sensor 20 varies linearly as a function of the angular rotation of the magnet 42. As such, the output voltage of the angular position sensor 20 can be applied directly to the fuel consumption circuit for the internal combustion engine without the need for additional and expensive external circuitry. In particular, known angular position sensors have utilized various circuitry including microprocessors to linearize the output voltage, which adds to the complexity and cost of the sensor. The angular position sensor 20 in accordance with the present invention eliminates the need for such external circuitry. In particular, the output signal is linearized by way of the generally L-shaped or book-end type flux concentrators 44 and 46, which not only direct the magnetic flux and control the density and polarity of the magnetic flux density but also linearize the output, signal to near straight line form. As such, the angular position sensor 20, in accordance with the present invention, is adapted to be substituted for potentiometer-type throttle position sensors which are contact devices with a finite life. More particularly, FIG. 7 illustrates a graph of the output voltage of the angular position sensor 20 as a function of the degrees of rotation. The solid line 72 represents the output of the angular position sensor 20 without the book-end shaped flux concentrators 44 and 46. As shown, the output voltage of such an embodiment varies relatively non-linearly relative to the degrees of rotation. By incorporating the book-end shaped flux concentrators 44 and 46, the output voltage of the angular position sensor 20 becomes fairly linear. More particularly, the solid line 74 represents the desired relationship between the output voltage of the angular position sensor 20 versus the degrees of rotation of the magnet 42. The dashed line 76 represents the output voltage of the sensor 20 which incorporates the book-end shaped flux concentrators 44 and 46. As illustrated, the dashed line 76 is fairly linear over the anticipated operating range of the sensor, for example, 110° rotation.

The book-end shaped flux concentrators 44 and 46 are formed from a magnetically soft material—a magnetically permeable material which does not retain residual magnetism. Various configurations of the book-end shaped flux concentrators 44 and 46 are contemplated, for example, as shown in FIGS. 8 and 9. Referring to FIG. 8, the book-end flux concentrators 44 and 46 are formed in a generally L-shape defining two depending leg portions 78 and 80. The outer intersection of the depending legs 78 and 80 defines a heel portion 82. The inner intersection of the depending legs 78 and 80 defines a generally accurately-shaped inner portion 84. It is also contemplated that the inner portion 84 may be formed such that the depending leg portions 78 and 80 are virtually perpendicular at the point of inter-section or have a predetermined radius of curvature as illustrated in FIG. 8. In the preferred embodiment illustrated in FIG. 9, the flux concentrators 44 and 46 are formed in a similar manner as the flux concentrators illustrated in FIG. 8 but with the heel portion 82 removed and a relatively larger radius of curvature for the inner portion 84.

In accordance with another important aspect, the sensor 20 allows the sensitivity (e.g., volts/degree of rotation) of the sensor 20 to be adjusted mechanically. As discussed above, various known sensors utilize potentiometers or variable resistors and the like for varying the sensitivity of the sensor. However, such sensors are relatively temperature dependent. Thus, in a relatively hostile environment where the temperature is anticipated to vary over a relatively wide range, the calibration of such sensors is known to drift. The angular position sensor 20 in accordance with the present invention solves this problem by providing a method for mechanically adjusting the sensitivity of the sensor without the need for potentiometers and the like. In particular, an additional flux concentrator 48 is provided. Although the flux concentrator 48 is described and illustrated having a halo or washer shape, as illustrated in FIG. 2, for example, it is to be understood that various shapes for the flux concentrator 48 are contemplated. For example, a rectangular shape may be used for the flux concentrator as illustrated and identified with reference numeral 48' in FIG. 15. In such an embodiment, various means within the ordinary skill in the art are contemplated for supporting the flux concentrator 48 relative to the magnet 42.

In one embodiment, the flux concentrator 48 is formed in a generally circular or halo shape with a centrally disposed aperture 86. The flux concentrator 48 is adapted to be disposed such that the midpoint of the aperture 86 is generally coaxial with the axis of rotation 50 of the magnet 42. The sensor's sensitivity is adjusted by varying the distance between the flux concentrator 48 and the magnet 42 in an axial direction relative to the axis of rotation 50 as indicated by the arrows 88 (FIG. 2). It is contemplated that the plane of the flux concentrator 48 be generally parallel the plane of the magnet 42. The halo-shaped flux concentrator 48 thus provides a mechanical and relatively stable method for adjusting the sensitivity of the sensor 20 utilizing a relatively inexpensive and until now often impractical class of linear IC; impractical because of the relatively wide range of part-to-part electrical output values of offset voltage and sensitivity per gauss.

In an alternate embodiment of the sensor as illustrated in FIG. 10, it is contemplated that the flux concentrator 48 be formed to be self-temperature compensating. In this embodiment, the flux concentrator 48 may be formed in a plurality of layers. Three layers are shown for example. The outer layers 90 are formed from a first material, for example, an iron-nickel alloy comprised of approximately 29%–33% nickel. The inner layer 92 is formed from low carbon steel, for example, C1008 low carbon steel. With such an embodiment, the properties of the nickel alloy used in the outer layers 90 cause the permeability of the outer layers 90 to decrease with an increase in temperature which decreases the ability of the flux concentrator 48 to concentrate magnetic flux as a function of temperature. Thus, as the temperature increases, the magnetic flux concentrator 48 captures less of the magnetic field causing a relatively greater portion of the magnetic field to be applied to the magnetic sensing element 43 during such a condition. Thus, since it is known that the magnetic field intensity of known magnets weakens as a function of temperature, the magnetic flux concentrator 48 illustrated in FIG. 10 allows a greater percentage of the magnetic flux density 68 to be applied to the magnetic sensing element 43 during relatively high temperature conditions and is thus self-temperature compensating.

Figure 11:
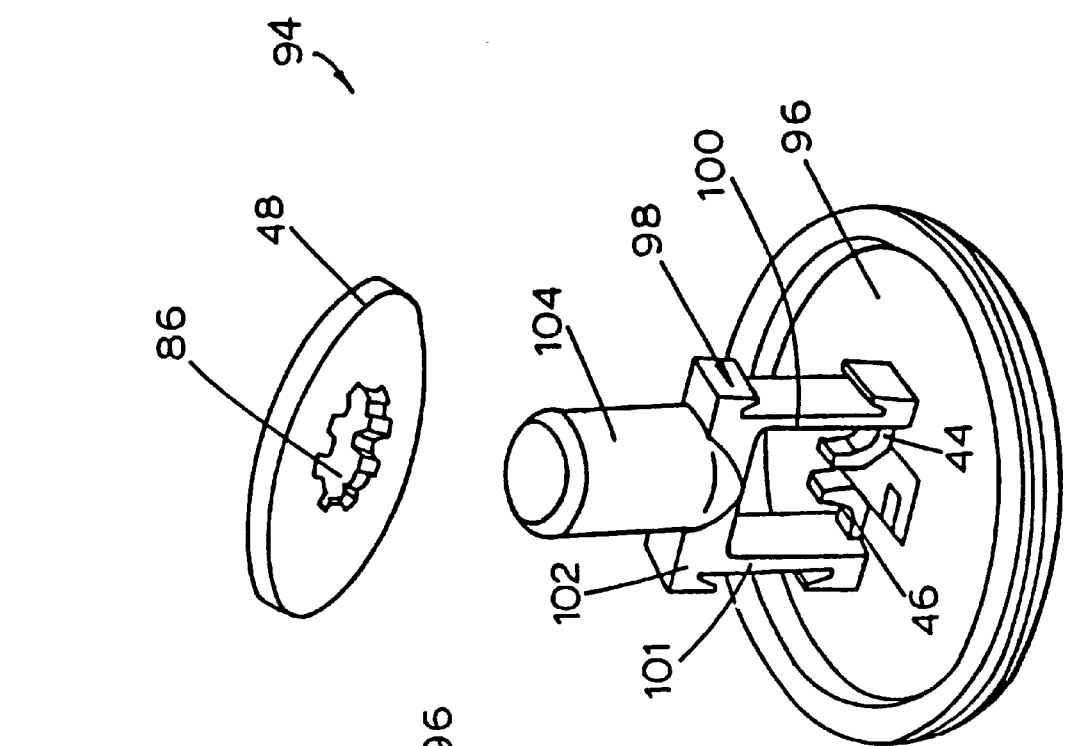
FIG. 11 is a perspective view of one embodiment of a carrier assembly in accordance with the present invention, shown with a flux concentrator removed.
Figure 12:
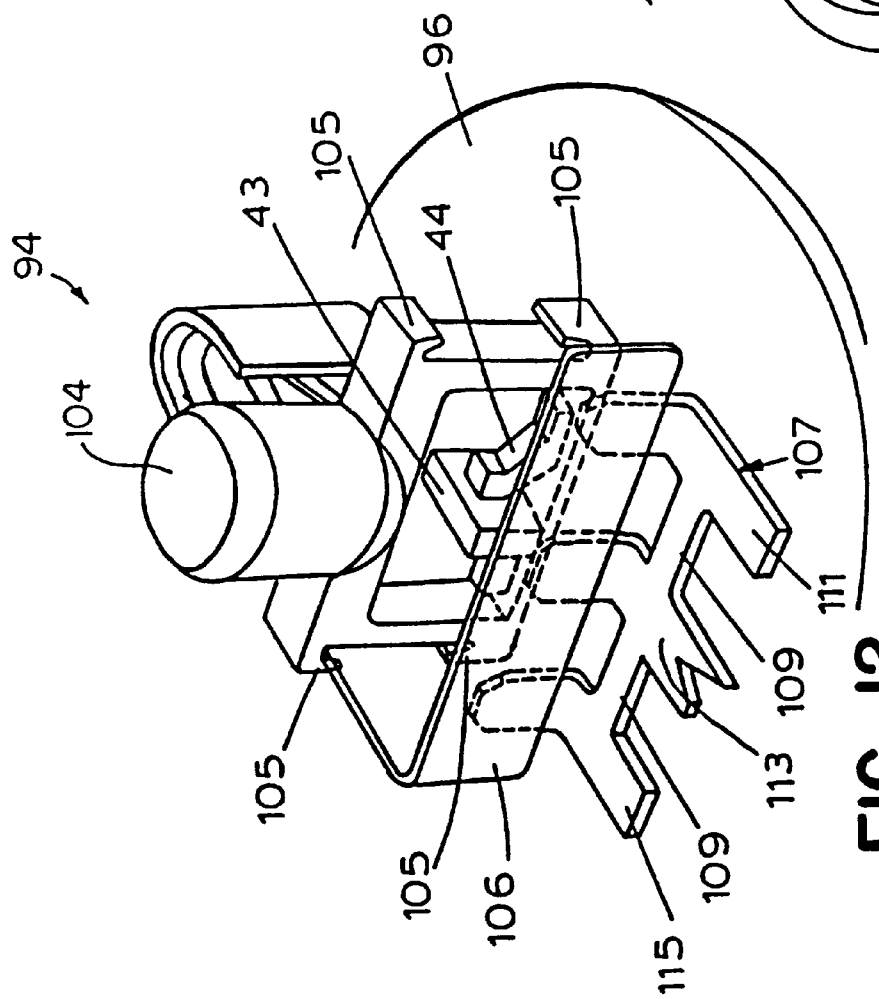
FIG. 12 is a perspective view of the assembly illustrated in FIG. 11 in a further stage of development.
Figure 15:
FIG. 15 is a perspective view of a flux concentrator in accordance with the present invention.

FIGS. 11 and 12 illustrate a carrier assembly 94 for carrying the magnetic sensing device 43 as well as the magnetic flux concentrators 44, 46 and a halo-shaped flux concentrator 48. In particular, FIG. 11 illustrates the carrier assembly 94 with the halo-shaped flux concentrator 48 removed. The carrier assembly 94 includes a disk-shaped base portion 96 and a generally T-shaped frame portion 98. The T-shaped frame portion 98 defines a pair of depending legs 100 and 101, disposed generally perpendicular to the plane of the base portion 96, interconnected by a connecting member 102. A stud portion 104 is formed to extend outwardly from the connecting member 102. The stud portion 104, as will be discussed in more detail below, is used for adjusting the distance between the halo-shaped flux concentrator 48 and the magnet 42. In alternate embodiments of the invention where a configuration other than a halo shape is used for the additional flux concentrator, for example, a rectangular shape, as illustrated in FIG. 15, the stud portion 104 is unnecessary and thus eliminated and substituted with a suitable arrangement for supporting such a flux concentrator 48' relative to the magnet 42.

Referring back to the first embodiment, the halo-shaped flux concentrator 48 is shown with a generally star-shaped aperture 86. In such an application, the diameter of the stud 104 is formed to provide a friction fit with the irregular-shaped aperture 86 to allow the sensitivity of the sensor 20 to be adjusted by way of axial movement of the flux concentrator 48 relative to the magnet 42. In an alternate embodiment of the invention, it is contemplated that the stud 104 and the aperture 86 be threaded to enable the distance between the flux concentrator 48 and the magnet 42 to be varied by rotating the flux concentrator 48.

The book-end type flux concentrators 44 and 46 are disposed intermediate the depending legs of the T-shaped frame 98 to enable the magnetic sensing device 43 to be sandwiched therebetween. As shown best in FIG. 14, the magnetic sensing device 43 is a three wire Hall effect IC. This magnetic sensing device 43 is adapted to be connected to a flexible printed circuit board 106 (FIG. 12) and wrapped around the frame 98 as best illustrated in FIG. 12. Opposing fingers 105 may also be formed in the depending leg portions 100 and 101 to capture a portion of the printed circuit board 106 as shown. A terminal structure 107 is then connected to the printed circuit board 106 to enable the sensor 20 to be connected to an external electrical conductor (now shown). The terminal structure 107 is shown in FIG. 12 with bridging members 109, which are removed to form three electrical terminals 111, 113 and 115. The carrier assembly 94 complete with the printed circuit board 106 is then assembled to the housing 22 as illustrated in FIG. 13.

Figure 14:
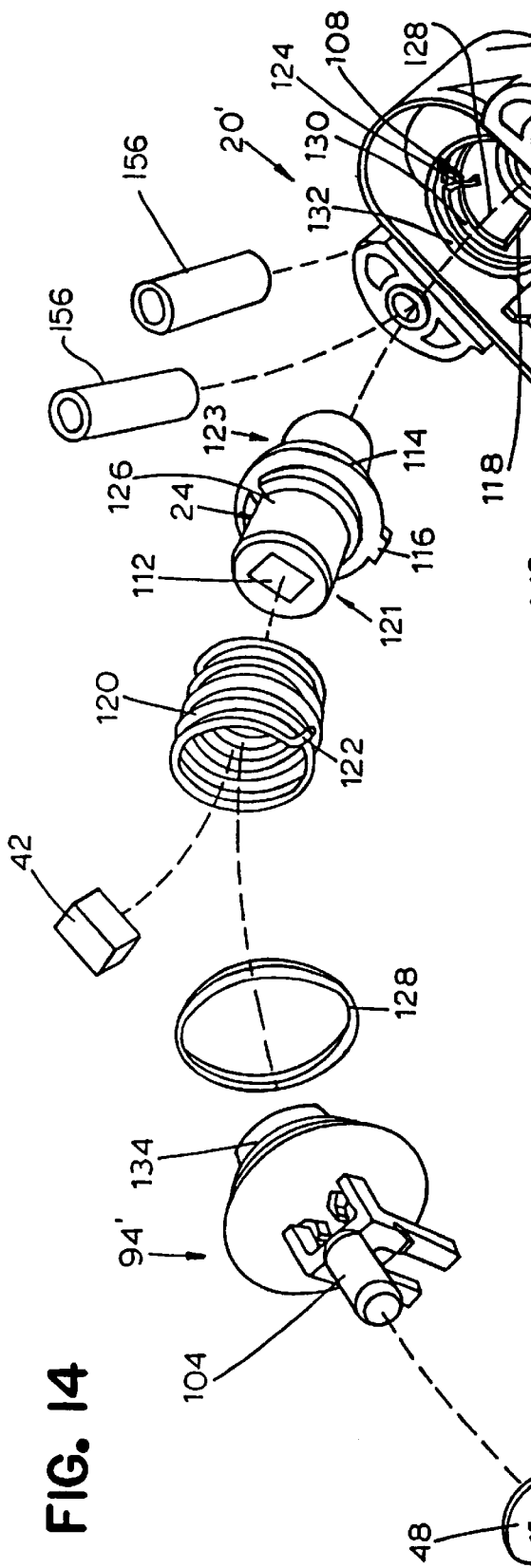
FIG. 14 is an exploded perspective view of an alternate embodiment of the angular position sensor in accordance with the present invention.

An alternate embodiment of the sensor is illustrated in FIG. 14, identified with the reference numeral 20'. In this embodiment, like components are identified with the same reference numerals and are distinguished with primes. The housing 22' is formed as an irregular-shaped housing with a central aperture 108 for receiving the drive arm 24. As best shown in FIG. 1, the drive arm 24 is formed with a centrally disposed aperture 110 on one end (FIG. 1) that is keyed or otherwise adapted to rotate with the butterfly valve shaft 26 defining a drive arm portion 123 (FIG. 14). The other end of the drive arm 24 is provided with a generally rectangular aperture 112 defining a magnet holder portion 121 for receiving the magnet 42. The drive arm 24 is adapted to be received in the aperture 108 formed in the housing 22'. The drive arm 24 may be formed with an integral washer 114 with an extending tongue 116. The tongue 116 cooperates with stops 118 formed within the aperture 108 which are radially disposed to limit the rotation of the drive arm 24 relative to the housing 22'. As will be appreciated by those of ordinary skill in the art, the location of the stops 118 within the aperture 108 are provided to coincide with the expected angular rotation of the device whose angular position is being sensed. As mentioned above, when the angular position sensor 20 in accordance with the present invention is used as a throttle position sensor, the stops 118 are provided to allow for about 110° of rotation. In alternate embodiments of the invention, the housing 22 may be formed without the stops 118 to enable a full 360° of isolation for the sensor 20.

The drive arm 24 may be biased by a torsion spring 120 having extending end portions 122. The bottom end portion (not shown) is adapted to be received in a slot 124 formed in the aperture 108. The top end portion 122 is received in a corresponding slot 126 formed in the drive arm 24. The diameter of the torsion spring 120 is sized to be slightly larger than the magnet holder portion 121. In embodiments wherein the sensor is adapted to rotate 360°, the torsion spring 120 is eliminated.

The aperture 108 is formed with concentric walls 128, 130 and 132. The concentric wall 128 only spans a portion of the circumference of the aperture 108 to form the stops 118 as discussed above. The drive arm portion 123 is received within the aperture 108 to allow rotational movement of the tongue 116 relative to the stops 118, formed in the partial concentric inner wall 128. The magnet holder portion 121 is received in an integrally formed circular guide, 134 formed on the underside of the carrier 94'. Once the drive arm 24 and torsion spring 120 are disposed within the aperture 108, the carrier assembly 94 closes the aperture 108 by way of an O-ring 158 forming the angular position sensor in accordance with the present invention. As shown, the carrier 94' and printed circuit board 106' are configured differently than the embodiment illustrated in FIGS. 11–13.

As shown, the printed circuit board 106' may include three conductive tracings 132 for connecting the electrical conductors 144 from the magnetic sensing element 43 thereto. A pair of capacitors 138, preferably surface mount capacitors, are electrically connected with the conductive tracings 132 to suppress noise-to-ground. Three plated-through holes 140 are provided for connecting the conductors 144 of the magnetic sensing device 43 to the printed circuit board 106'. The printed circuit board 106' includes an additional three plated-through holes 142 for connection with corresponding terminals 148, insert molded into the housing 22', which enables the sensor 20' to be connected to an external electrical conductor (not shown). Once the components of the sensor 20' are assembled, the component side 146 of the sensor 20' is then potted with a suitable potting compound, such as epoxy to seal the electrical components. This allows the electrical components of the sensor to be sealed from moisture, contaminants and the like without the need for a dynamic or a static seal as discussed above. As such, the seal in accordance with the present invention is virtually unaffected by wear or vibration.

As discussed above, the angular position sensor 20, 20' is connected to a throttle body 27 by way of the fasteners 40. Thus, the housing 22, 22' may be provided with a pair of oppositely disposed apertures 154 for receiving a pair of insert molded mounting sleeves 156. The fasteners 40 are received in the mounting sleeves 156 and are used to connect the sensor 20, 20' to the throttle body 27.

Figure 16:
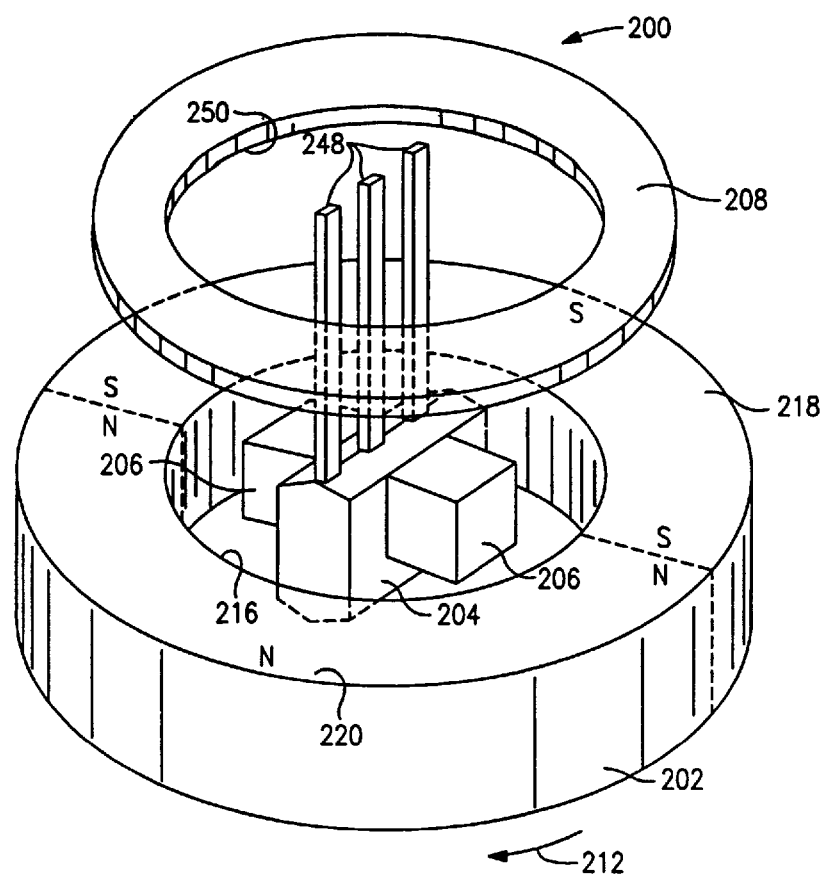
FIG. 16 is a perspective view of an alternate embodiment of the angular position sensor illustrated in FIG. 1.
Figure 17:
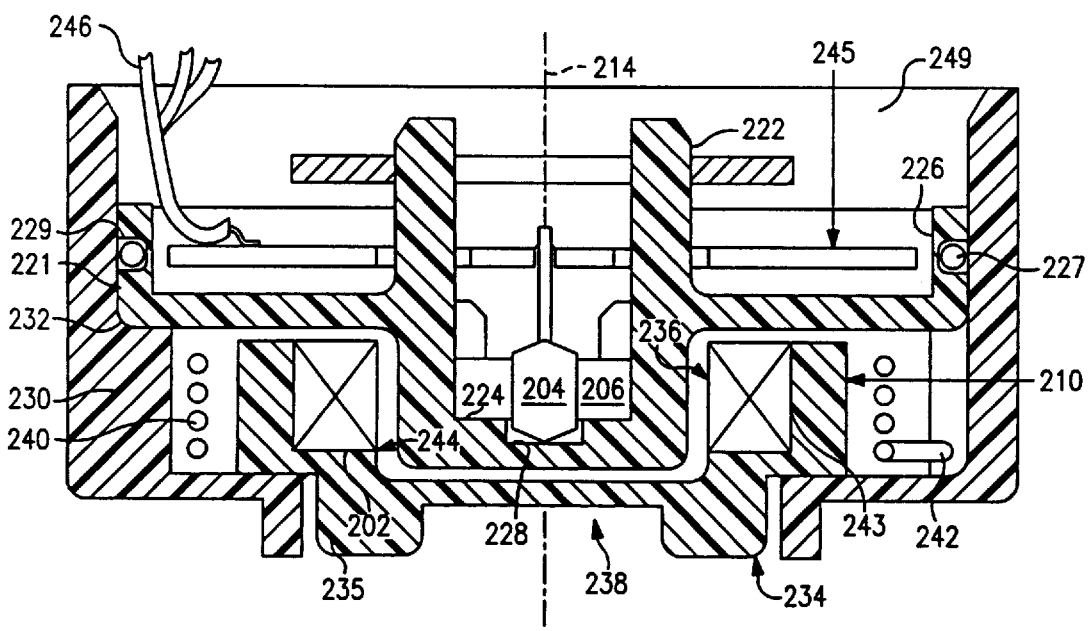
FIG. 17 is a cross sectional view in elevation of the angular position sensor illustrated in FIG. 16.

An alternate embodiment of the throttle position sensor is illustrated in FIGS. 16 and 17 and generally identified with the reference numeral 200. This throttle position sensor 200 includes a magnet 202, a magnetic sensing element 204, one or more flux concentrators 206 rigidly secured relative to the magnetic sensing element 204 and a movably mounted flux concentrator 208 which enables the throttle position sensor 200 to be adjusted mechanically without the need for potentiometers and the like. In this embodiment, the magnet 202 is carried by a drive arm assembly 210 rotatably mounted relative to the magnetic sensing element 204 and the stationary mounted flux concentrators 206 and 208. As shown by the direction of the arrows 212, the magnet 202 is adapted to rotate about an axis 214.

The magnet 202 is formed as a generally circular element with a center aperture 216. The magnet 202 is formed such that each semicircular portion forms a pole. In particular, a semicircular portion 218 forms a south pole, while a semicircular portion 220 forms a north pole.

The magnetic sensing element 204 and the rigidly mounted flux concentrators 206 are carried by a housing 221; the housing 221 being formed from a non-magnetically conductive material; for example, plastic, brass or aluminum. In particular, the housing 221 as best shown in FIG. 17 is formed with a generally cylindrical portion 222 closed on one end 224 and an annular skirt portion 226. The magnetic sensing element 204 may be sandwiched between the rigidly mounted flux concentrators 206 and carried by the closed end 224 of the cylindrical portion 222 of the housing 221. A notch 228 may be formed in the closed end 224 for capturing the magnetic sensing element 204 to facilitate proper orientation of the magnetic sensing element 204 relative to the housing 221.

The outer diameter of the cylindrical portion 222 of the housing 221 may be formed to be relatively smaller than the diameter of the centrally disposed aperture 216 in the circular magnet 202. Such a configuration enables the cylindrical portion 222 of the housing 221 to be disposed within the aperture 216 in order to reduce the overall axial length of the sensor 200.

A cover 230 is provided and adapted to be rigidly secured to the throttle body 27 (FIG. 1) in a similar manner as discussed above. The cover 230 is formed as a generally cylindrical member with at least a partial interior annular shoulder 232 and a mouth portion 234. The annular shoulder 232 defines a first interior diameter and a second interior diameter. The first interior diameter is selected to be slightly larger than an outer diameter of the skirt portion 226 of the housing 221. An O-ring 227 may be used to seal the housing 221 relative to the cover 230 to prevent the potting material from getting into the area of the drive arm 235. The O-ring 227 may be disposed in an annular notch 229 formed in the housing 221.

The second interior diameter of the cover 230 is relatively smaller than the first interior diameter. The size of the second interior diameter of the cover 230 is selected to enable the drive arm assembly 210 to rotate freely therewithin.

The drive arm assembly 210 includes a drive arm 235 formed as an annular member with an irregular shape defining an annular well portion 236 and a drive portion 238. The annular well portion 236 is formed to receive the cylindrical portion 222 of the housing 221 to enable the overall axial length of the sensor 200 to be reduced in a manner as discussed above. The drive portion 238 is adapted to be coupled to the throttle shaft 26 in a manner as discussed above such that the drive arm assembly 210 rotates with a throttle shaft 26.

A helical spring 240 is used to bias the drive arm assembly 210 to a predetermined position, for example, the position shown in FIG. 17. In particular, a helical spring 240 is disposed about the outer diameter of the drive arm 235. One end (not shown) of the helical spring 240 is rigidly secured to the drive arm 235. The other end 242 of the spring 240 is rigidly secured to the cover 230. As such, rotation of the drive arm assembly 210 relative to the cover 230 can cause compression or tension of the spring 240 to bias the drive arm assembly 210.

The well portion 236 of the drive arm 235 is formed with an interior annular shoulder 243. The dimensions of the annular shoulder 243 are selected to enable the circular magnet 202 to be flush with an interior annular wall 244 of the drive arm 235.

The sensor 200 also includes a printed circuit board (PCB) 245. The PCB 245 is carried by the cylindrical portion 222 of the housing 221 for providing an electrical path between the magnetic sensing element 204 and a set of external electrical leads 246. In particular, if a Hall effect device is used for the magnetic sensing element 204, such a device will have a plurality of electrical leads 248. The PCB 245 is formed to provide an electrical path between the electrical leads 246 and 248 in a manner as discussed above.

An important aspect of the invention is the mechanical method for adjusting the sensitivity of the sensor 200 which eliminates the problems discussed above with sensors with electronic sensitivity adjustments. The offset voltage of the sensor 200 is adjusted in a similar manner as discussed above; namely, rotating the cylindrical portion 221 and the sensing plane of the magnetic sensing element 204 with respect to the magnet 202.

The sensitivity of the sensor 200 is adjusted by varying the axial distance between the flux concentrator 208 and the magnetic sensing element 204. As best shown in FIG. 17, the flux concentrator 208 is carried by the cylindrical portion 222 of the housing 221 with a slight friction or interference fit to enable the axial distance relative to the magnetic sensing element 204 to be varied. More specifically, the flux concentrator 208 is formed in a generally circular shape with a central aperture 250. The diameter of the central aperture 250 is selected to be slightly smaller than the outer diameter of the cylindrical portion 222 of the housing 221 to enable the flux concentrator 208 to be carried thereby in order to enable the axial distance between the flux concentrator 208 and the magnetic sensing element 204 to be varied. Once the axial distance of the flux concentrator 208 is set, a portion of the housing 221 is potted with a suitable potting material 249, such as epoxy, to seal the assembly from dust, moisture and other harmful contaminants. The annular skirt portion 226 of the housing 221 protects the bottom portion (FIG. 17) from the potting material 249 in order to allow the drive arm assembly 210 to rotate freely.

In operation, rotation of the throttle shaft 26 causes rotation of the drive arm assembly 210. Since the magnet 202 is rigidly secured to the drive arm assembly 210, such rotation will cause the relative angular position of the north and south magnetic poles 202 to vary relative to a sensing plane of the magnetic sensing element 204. Such a change will cause the output signal from the magnetic sensing element 204 to vary as a function of the change in angular position of the magnet 202 and the throttle shaft 26.

SMART SENSOR CIRCUITRY-ANALOG OUTPUT

Automatic calibration for a displacement type sensor, such as an angular position sensor, is illustrated in FIGS. 18–30. In particular, the embodiment illustrated in FIGS. 18–30 is provided with electronic circuitry with an analog output which automatically compensates for any errors in the output signal due to the electronics, part-to-part variations of the magnet or temperature. The electronic circuitry includes an electronic memory, such as an electrically erasable read-only memory (EEPROM) for storing predetermined compensation values used to compensate the output signal of the sensor. The compensation values are determined by comparing the output signals of the sensor at predetermined calibration angles with ideal values. The deviation between the actual values and the ideal values is used to determine the compensation values as discussed in more detail below. The compensation values are stored in the electronic memory and used to automatically compensate the output signal of the sensor. As will be discussed in more detail below, the compensation of the output signals is done under software control which eliminates the need for mechanical adjustment of the sensor as described in the connection with the embodiment illustrated in FIGS. 1–17; thus providing automatic calibration.

An important aspect of the invention is that the electronic circuitry enables the compensation values to be determined by the sensor manufacturer and stored in the EEPROM. Thus, once the sensors are shipped to the end user, the end user simply installs the sensor.

There are several error sources associated with such sensors. More particularly, such sensors normally include a Hall effect device 43, which typically include on-chip operational amplifiers. Such operational amplifiers are frequently subject to offset errors which may vary from part-to-part. In addition, part to part variations in the magnetic flux distribution of the magnets used with such sensors also necessitates sensitivity adjustment of the Hall Effect device relative to the magnet. In addition, such sensors are also subject to error due to temperature variation.

The electronic circuitry in accordance with the present invention, as illustrated in FIGS. 18–30, automatically compensates for such errors, thus obviating the need for mechanical adjustment. Although the electronic circuitry illustrated in FIGS. 18–30 and described hereinafter is discussed in terms of the angular position sensor, similar to the sensor illustrated in FIGS. 1–17, the principles of the present invention are applicable to virtually any angular position sensor and for that fact any displacement type sensor which measures angular or linear displacement and provides an analog output signal.

In addition, although the electronic circuitry is discussed in terms of various discrete electronic components, as discussed below, the principles of the present are also applicable to other electronic components which generally perform the same basic functions. For example, all or a portion of the electronic circuitry described and illustrated below could be formulated into an application specific integrated circuit (ASIC). All such embodiments are considered to be within the broad scope of the invention.

Figure 18:
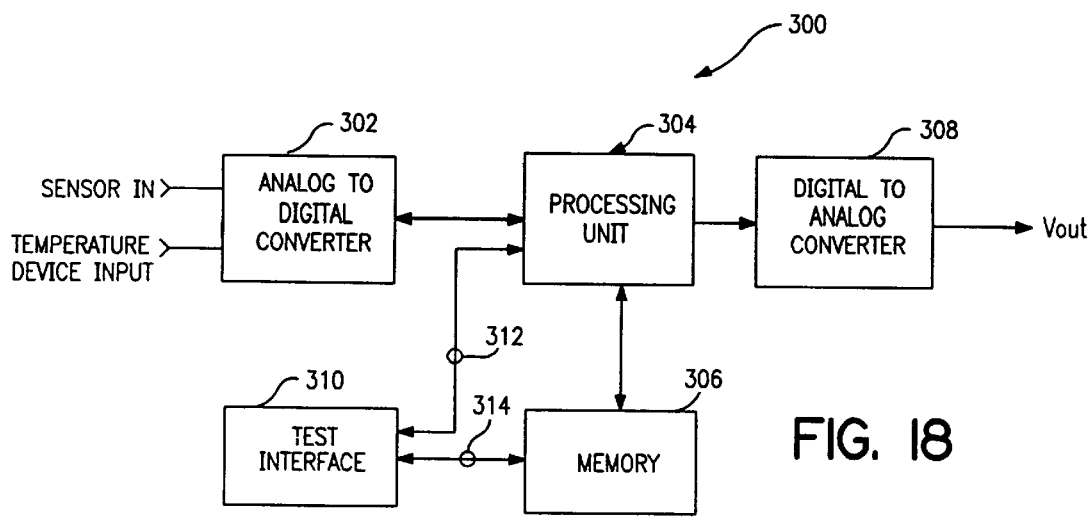
FIG. 18 is a block diagram of electronic circuitry for automatically compensating the output signal of an angular position sensor in accordance with the present invention.
Figure 19:
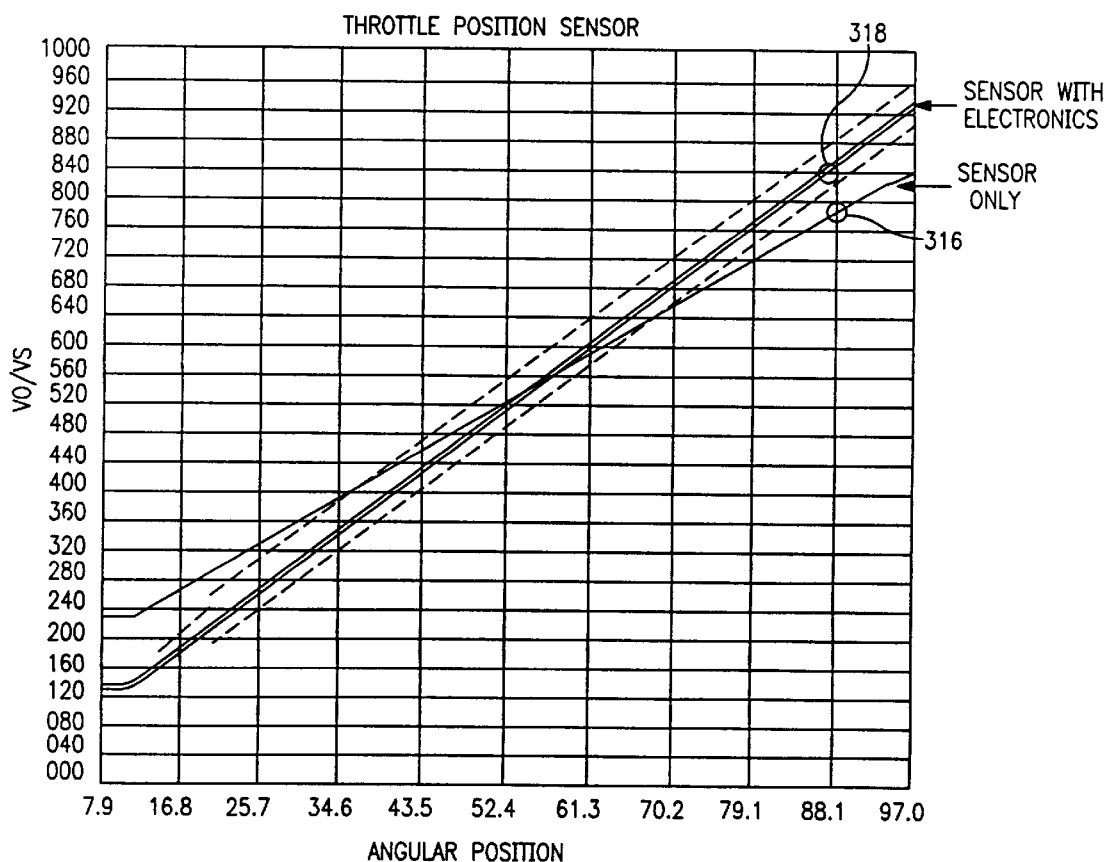
FIG. 19 is a graphical representation of the output voltage of an angular position sensor as a function of angular position, illustrating a sensor with and without the electronic circuitry illustrated in FIG. 18.

Referring to FIG. 18, the electronic circuitry, generally identified with the reference numeral 300, includes a analog to digital converted (ADC) 302, for example, a twelve-bit serial ADC model number LTC 1298, as manufactured by Linear Technology, Inc., described in detail in *LTC1286/ LTC1298 MICROPOWER SAMPLING TWELVE BIT A/D CONVERTERS IN SO-8 PACKAGES,* by Linear Technology, Inc., pages 6–140 to 6–162, hereby incorporated by reference. One input to the ADC 302 is the output of the Hall effect device, for example the output signal 248 on the Hall effect device 204 (FIG. 16). The Hall effect device is a linear device, for example, an Allegro model no. 3506, which provides a relatively linear output signal over the useful output range of the Hall effect device, as shown in FIG. 19 and discussed below. A temperature sensor, for example a thermistor 330 may also be applied to the ADC 302. The analog temperature and sensor signals are digitized by the ADC 302 under the control of a microcontroller 304, for example, a Motorola model number 68HC705J2, HCMOS Microcontroller, described in detail in *HC05 MC68HC705J2 TECHNICAL DATA,* by Motorola, Inc., copyright 1991, hereby incorporated by reference. The microcontroller 304 compares the digitized sensor output signal values from the ADC 302 with compensation values stored in an electronic memory 306, for example a Micro-Chip Technology, Inc., Model No. 93C46 CMOS EEPROM, described in detail in *MICROCHIP 93C06/46 256 BIT/1K 5B CMOS SERIAL EEPROM, BY MICROCHIP TECHNOLOGY, INC.,* COPYRIGHT 1994, hereby incorporated by reference. The deviations between the actual values from the ADC 302 and a the stored compensation values from the electronic memory 304 are used by the microcontroller 304 to generate compensated output values that are applied to a digital to analog converter (DAC) 308. The DAC 308 may be a Maxim Model No. MAX539, 12 bit DAC described in detail in *MAXIM 5V, LOW-POWER, VOLTAGE OUTPUT, SERIAL 12-BIT DAC'S MAX531 MAX538/MAX539* by Maxim Integrated Products, Copyright 1994, hereby incorporated by reference. The DAC 308, in turn, provides a compensated analog output voltage signal $V_{OUT}$.

The electronic circuitry 300 includes a test interface 310 which enables the compensation values to be determined, for example by the sensor manufacturer, and programmed into the electronic memory 306. The test interface 310 is connected to the balance of the electronic circuitry 300 by a pair of cables 310 and 314. The cable 312 is connected between the test interface 310 and the microcontroller 304 while the cable 314 is connected between the test interface 310 and the electronic memory 306. These cables 310 and 314 allow for serial communication between the electronic circuitry 300 and the test interface 310 to enable the compensation values to be determined. More particularly, as will be discussed in more detail below, in a CALIBRATION mode, the angular position sensor is tested at a predetermined number of calibration points (i.e., angular positions). The output signals from the sensor at the predetermined calibration points are then compared with the ideal values for each point to determine the deviation of the actual values from the compensation values. These deviations are used to determine the compensation values for each position of the sensor. The compensation values are, in turn, programmed into the electronic memory 306. Once the compensation values are programmed into the electronic memory 306, the test interface 310 may be disconnected from the electronic circuitry 300.

FIG. 19 is a graphical representation of the automatic compensation of the electronic circuitry 300. In particular, the output signal of the sensor as a fraction of the power supply voltage VS along the vertical axis is plotted as a function of an exemplary angular operating range, for example 90 degrees. The curve 316 represents the output of the sensor without compensation over the exemplary operating range of the sensor while the curve 318 represents the output of the sensor which incorporates the electronic circuitry 300 (FIG. 18) in accordance with the present invention. The curve 318 corresponds with the ideal values.

Although the output curve for a typical sensor is not perfectly linear as illustrated in FIG. 19, the curve can be approximated on a piecemeal linear basis to generate the ideal curve 318 in response to sensor values along the curve 316. As such, the electronic circuitry 300 is adapted to provide automatic compensation for the sensor output signal 300. The determination of the compensation values is discussed in detail below.

Figure 20:
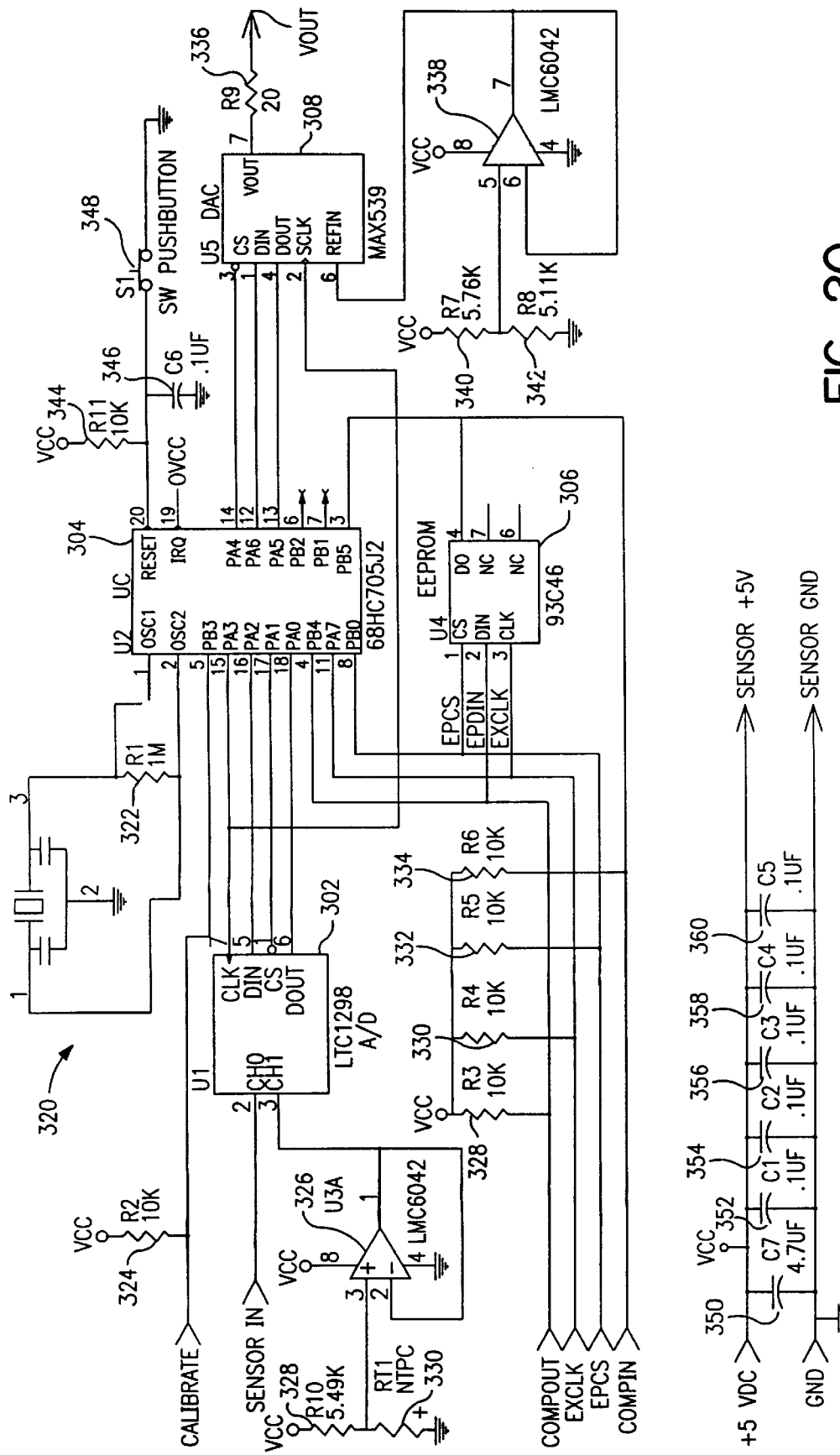
FIG. 20 is a schematic diagram of the electronic circuitry illustrated in FIG. 18.
Figure 21:
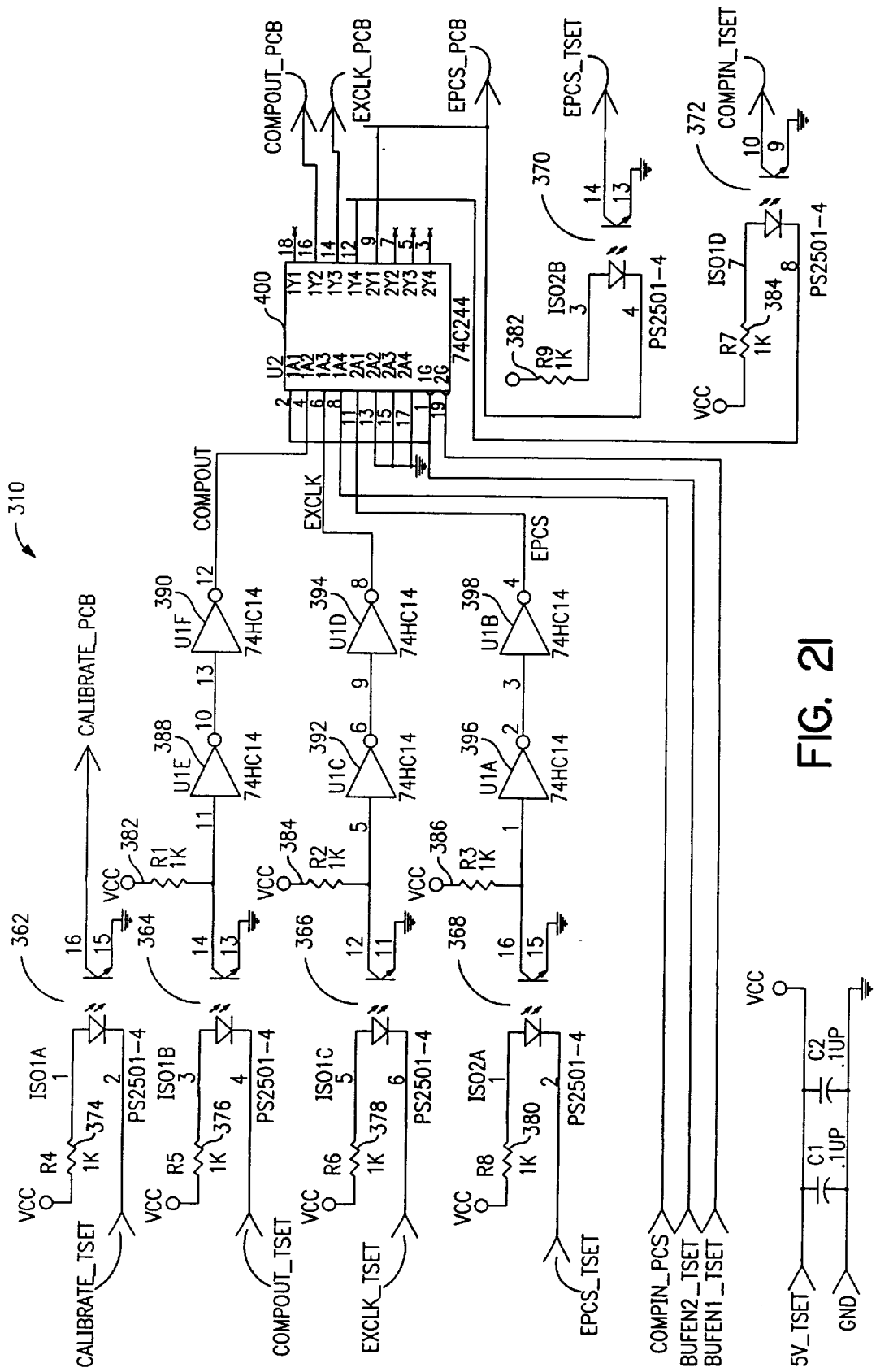
FIG. 21 is a schematic diagram of a test interface in accordance with the present invention.

A schematic diagram for the electronic circuitry 300 shown in FIG. 18 is illustrated in FIG. 20, while a schematic diagram for the test interface 310 is illustrated in FIG. 21. Referring first to FIG. 20, an oscillator signal for the microcontroller 304 is provided by an oscillator circuit 320, for example an AVX KYOCERA, KBR-4.00-MKS TR Ceramic Resonator, as described on a data sheet entitled, *KBR-MKS SERIES CERAMIC RESONATORS*, P14 BY AVX KYOCERA, hereby incorporated by reference. The oscillator circuit 320 is connected to the oscillator pins OSC1 and OSC2 of the microcontroller 304, along with a parallel connected resistor 322 to form a parallel resonance circuit, for providing, for example, a 4 megahertz (mHz) oscillator signal to the microcontroller 304.

The microcontroller 304 includes an 8-bit port PA[7:0] and a 6-bit port PB[5:0]; all of the bits being programmable as either input or output ports by way of data direction registers on board the microcontroller 304. A CALIBRATE mode signal is applied to a port bit PB[3]; programmed as an input port bit. The CALIBRATE mode signal is available at the test equipment 402 (FIG. 22) by way of the test interface 310 (FIG. 21). As will be discussed in more detail below, the CALIBRATE mode signal is enabled when the test equipment 402 is being used to determine the compensation values to be written to the EEPROM 306. In particular, the port bit PB[3] is normally pulled high by a pull-up resistor 324, connected between the port bit PB[3] and the sensor 5 volt power supply VCC. Normally, the port bit PB[3] will be high. During a CALIBRATE mode, the CALIBRATE signal pulls the port bit PB[3] low to let the microcontroller 304 know the system is in a CALIBRATE mode.

A SENSOR IN signal, such as from an analog Hall effect device, is applied to one channel CH0 of the ADC 304, which includes a two-channel multiplexed input at pins CH0 and CH1. The thermistor 330 is applied to the other channel CH1 by way of an operational amplifier 326 and a serially connected resistor 328. The output of the operational amplifier is applied to the second input CH1 of the ADC 304.

The ADC 302 is a two-channel device and communicates with the microcontroller 304 by way of a synchronous half-duplex 4-wire serial interface. In particular, the serial interface includes a clock signal CLK, a chip select signal CS, a digital data input signal DIN and a digital data output signal DOUT, applied to port bits PA[3], PA[1], PA[2] and PA[0] respectively. The port bits PA[3], PA[2] and PA[1] are configured as outputs while the port bit PA[0] is configured as an input.

Data transfer between the micro-controller 304 and the ADC 302 is initiated by a falling edge of the chip select signal CS. The clock signal CLK synchronizes the data transfer in both directions. After the chip select signal CS goes low, the ADC 302 awaits a start bit on the data input pin DIN. The first logical one shifted into the data input DIN pin after the chip select signal CS goes low represents the start bit. The next three bits shifted in after the start bit are used to configure the ADC to the select one of the input signals at the CH0 and CH1 inputs for conversion and to specify whether the most significant bit (MSB) or the least significant bit (LSB) is shifted out first on the data out DOUT pin. After the start bit and three configuration bits are shifted into the data input pin DIN, the conversion process begins. Any additional bits shifted into the data input pin DIN are ignored until the next chip select CS cycle.

Data transfer between the microcontroller 304 and the test interface 310 are handled in a similar manner. In particular, four signals, a data out signal COMPOUT, a data in signal COMPIN, a clock signal EXCLK, and a chip select signal EPCS are used to control serial communication between the test interface 310 and the microcontroller 304. Each of the signals COMPOUT, EXCLK, EPCS and COMPIN are tied high by way of pull-up resistors 328, 330, 332 and 334, respectively.

The COMPOUT and COMPIN signals are used for handshaking and data communication between the microcontroller 304 and the test interface 310. The COMPIN signal is available at port bit PB[5] of the microcontroller 304 configured as an output. The COMPIN signal is also used to read serial data from the data output pin DO when the system is not in the CALIBRATE mode. The COMPOUT signal from the test interface 310 is applied to the port bit PB[4] of the microcontroller 304 and to the clock input of the EEPROM 306. The COMPOUT signal is used for writing to the EEPROM 306 as well as handshaking with the microcontroller 304. The chip select signal EPCS from the test interface 310 is used to enable the conversion values from the ADC 302 to be transferred to the test equipment 402 for determination of the compensation values when the chip select EPCS is deselected and to enable the compensation values to be written to the EEPROM 306 when the chip select signal EPCS is selected. The clock signal EXCLK is applied to the data input pin DI of the EEPROM 306 and to the port bit PA[7] of the microcontroller 304 to control the bit by bit transfer of the 12 bit output of the ADC 302 when the test equipment 402 is reading digitized sensor and thermistor values from the microcontroller 304 and controls the bit-by-bit writes to the EEPROM 306. A start bit is determined after the data input pin DI and chip select pins CS on the EEPROM 306 are high for the first time relative to the clock input CLK.

As discussed above, the values from the Hall effect device are corrected by the compensation values stored in the EEPROM 306. The compensated values are converted to analog form by the DAC 308 under the control of the micro-controller 304. In particular, the DAC 308 includes a chip select pin CS, a data input pin DI, a data output pin DOUT and a clock pin CLK, that are controlled by the microcontroller 304. These pins are connected to port pins PA[4], PA[6] PA[5] and PA[0], respectively on the microcontroller 304 and are all configured as outputs. The data output pin DOUT on the DAC 308 enables the digital data from the DAC 308 to be read back by the microcontroller 304. The analog output of the DAC 308 is available at an output pin $V_{OUT}$ and is coupled to an external circuit (not shown) by way of a resistor 336.

A reference voltage, for example, developed by an operational amplifier 338 and a pair of serially connected resistors 340 and 342, configured as a voltage divider, are applied to a reference input REFIN of the DAC 308. The reference voltage is used to set the full scale output of the DAC 308.

In order to assure proper operation of micro-controller 304, interrupt request pin IRQ is tied high, and, in particular, connected directly to the five-volt supply VCC, since the system does not need to monitor any interrupts. The microcontroller 304 is reset by way of its reset pin RESET. The RESET pin is normally pulled high by a pull-up resistor 344, connected between the power supply voltage VCC and the RESET pin. In order to prevent spurious operation of the signal applied to the RESET pin, a capacitor 346 is coupled between the RESET pin and ground. The microcontroller 304 is reset by way of a pushbutton 348, connected between the RESET pin and ground. Normally, the RESET pin is high. When the RESET push button 348 is depressed, the RESET pin is brought low to indicate a forced RESET to the microcontroller 304. In order to stabilize the power supply voltage to the microcontroller 304, a plurality of capacitors 350, 352, 354, 356, 358 and 360 are connected between the five-volt sensor supply VCC and the sensor ground.

The schematic diagram for the test interface 310 is shown in FIG. 21. In order to provide electrical isolation between the test interface 310 and the electronic circuitry 300, a plurality of optical isolators 362, 364, 366, 368, 370 and 372 are used to isolate connections between the test interface 310 and the electronic circuitry 300. The signals with the suffix \_.TSET indicate connection to the test equipment 402 (FIG. 22) while the signals with the suffix \_.PCB indicate connection to the electronic circuitry 300 (FIG. 20).

Each of the optical isolators 362, 364, 366, 368, 370 and 372 includes a light-emitting diode (LED) and a photo-transistor. The anodes of each of the LEDs are connected to the power supply voltage VCC by way of current-limiting resistors 374, 376, 378, 380, 382 and 384. The cathode of each of the LEDs is connected to the appropriate signals as will be discussed below. In operation, when the signals connected to the cathodes of the LEDs are brought low, the LEDs will emit light which will be sensed by the photo-transistors. The photo-transistors are connected with their emitters grounded. The collectors are connected to the various signals discussed above. As will be discussed in more detail below, the collectors are normally pulled high and go low when light is sensed from the LEDs. More particularly, a CALIBRATE_TSET signal from the test interface 310 is applied to the anode of the optical isolator of the LED forming the optical isolator 362. The collector of the photo-transistor is the CALIBRATE signal, which, as discussed above, is applied to the port PB[3] of the micro-controller 304.

Figure 22:
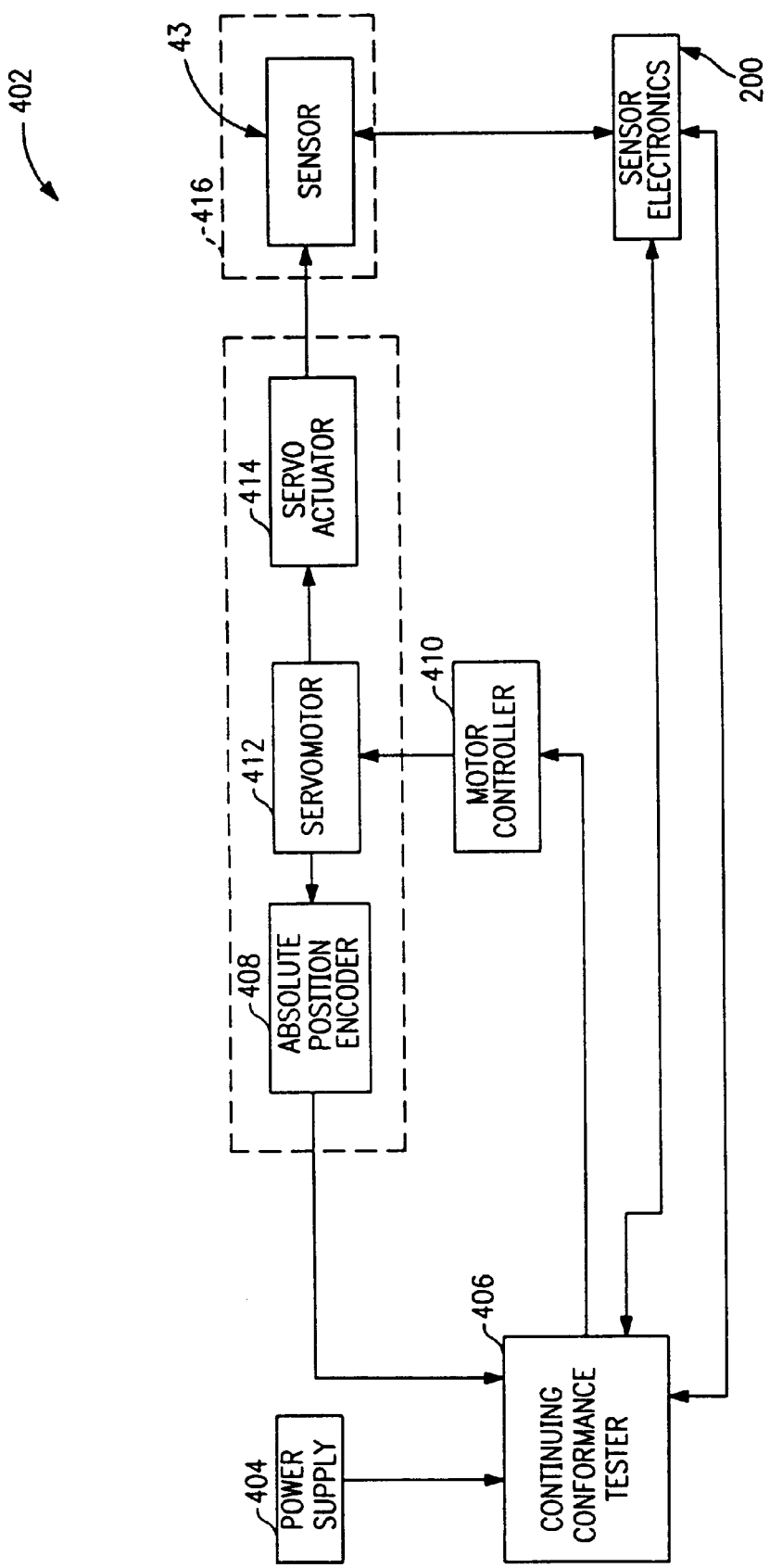
FIG. 22 is a block diagram of the test equipment for determining the compensation values in accordance with the present invention.
Figure 23:
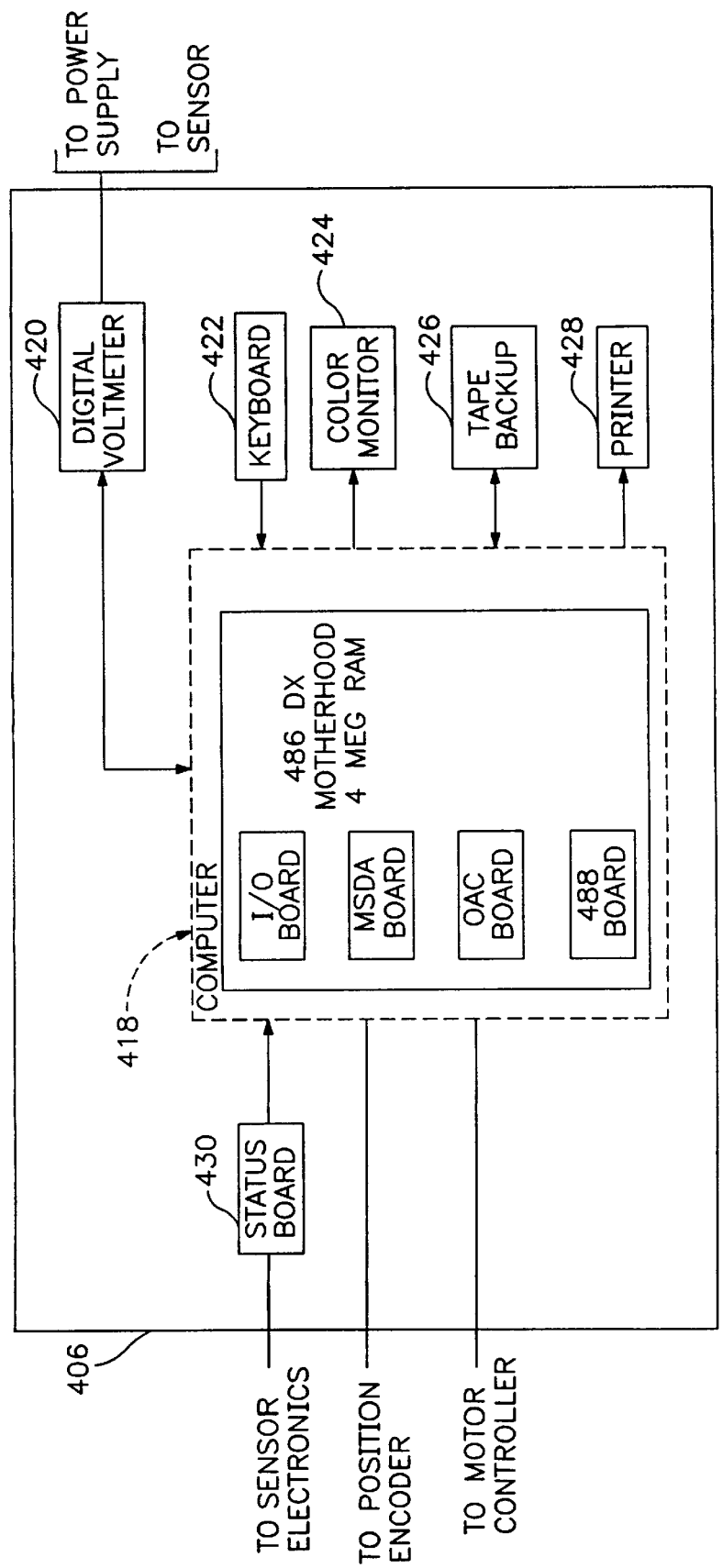
FIG. 23 is a block diagram of the personal computer interface which forms a portion of the test equipment illustrated in FIG. 22.

As mentioned above, the COMPIN, COMPOUT, EXCLK and EPCS signals are used for forming a serial communication interface between the microcontroller 304 and the test equipment 402 illustrated in FIGS. 22 and 23. The signals COMPOUT_TSET, EXCLK_TSET, and EPCS_TSET, available from the test equipment 402 (FIG. 22), are applied to the cathodes of the LEDs forming the optical isolators 364, 366 and 368, respectively. The collector outputs of the optical isolators 364, 366, 368 are tied high by way of pull-up resistors 382, 384, and 386, respectively. As mentioned above, the emitter terminals of each of the photo-transistors associated with the optical isolators 364, 366 and 368 respectively are grounded. Thus, during normal operation the collectors of the optical transistors associated with the optical isolators 364, 366 and 368 will be high. When the signals COMPOUT_TSET, EXCLK_TSET, EPCS_TSET go low, the collector outputs of the photo-transistors associated with the optical isolators 364, 366 and 368 will go low. The collectors of the photo-transistors associated with the optical isolators 364, 366 and 368 are applied to a pair of serially connected NOT gates 388, 390, 392, 394, 396 and 398, for example type 74HC14, which act as buffers to buffer the output of the optical transistors associated with the optical isolators 364, 366 and 368.

In order to provide isolation of the test interface 310 from the balance of the electronic circuitry 300 when the system is not in a CALIBRATE mode, the signals COMPOUT_TSET, EXCLK_TSET, EPCS_TSET and COMPIN_PCB are applied to a quad-tristate device, for example a type 74C 244. In particular, the COMPOUT signal, available at the output of the NOT gate 390, is applied to an input 1A2, while the COMPIN signal available at port bit PB[5] of the micro-controller 304 (FIG. 20), is applied to the 1A4 input of the tristate device 400. Similarly the EXCLK and EPCS signals, available at the outputs of the NOT gates 394 and 398 respectively, are applied to the 1A3 and 2A1 inputs of the tristate device 400.

The tristate device 400 provides yet another isolation interface between the test interface 310 and the electronic circuitry 300. In particular, the COMPOUT_PCB, EXCLK_PCB, and EPCS_PCB signals, available at the 1Y2, 1Y3 and 2Y1 outputs of the tristate are connected to the microcontroller 304 (FIG. 20) as discussed above. The EPCS_TSET and COMPIN_TSET signals, available at the 2Y1 and 1Y4 outputs of the tristate device 400, are isolated by the optical isolators 370 and 372 in a similar manner as discussed above and applied to the test equipment.

The tristate device 400 is under control of buffer enable signals BUFEN1_TSET and BUFEN2_TSET, available at the test equipment 402. As will be discussed in detail below, during a CALIBRATE mode, the tristate device 400 will be enabled thus connecting the serial communication control signals between the test equipment and the electronic circuitry 300 by way of the optical isolation circuits discussed above. During conditions other than the CALIBRATE mode the tristate device 400 provides electrical isolation of the electronic circuitry 300 from the test interface 310.

The test equipment is illustrated in FIG. 22 and is generally identified with the reference numeral 402. The test equipment 402 includes a power supply 404 which provides a five-volt DC voltage supply for the sensor. The power supply 404 may be a Hewlett Packard Model No. E3620 A. The power supply voltage is monitored by a Continuing Conformance Tester 406, for example, a S/N 95015 by Altech Control Systems. The Continuing Conformance Tester 406 monitors the voltage from the power supply 404 to ensure that it is within proper limits. As will be discussed below, the Continuing Conformance Tester 406 includes a personal computer and various peripherals as illustrated in FIG. 23. In a CALIBRATION mode the Continuing Conformance Tester 406 positions the sensor to predetermined calibration angles by monitoring an Absolute Position Encoder 408, for example, a model No. M25G-F1-L8192-G-XD2-CR-E-C25-X-5 by BEI Motion Systems Company, Positions Controls Division. By monitoring the Absolute Position Encoder 408, the Continuing Conformance Tester 406 is able to generate an error voltage to a motor controller 410, for example, a model number SC401-01-T1 by Pacific Scientific Motor & Control Division, proportional to the distance away from the required angle. The motor controller 410 drives a servo motor 412, for example, a model R21KENT-TS-NS-NV-00 by Pacific Scientific Motor & Control Division. The Servo Motor 412 in turn drives a servo actuator 414, for example, a model number RH-100-CC-SP by Harmonic Drive Systems, Inc. which, in turn, positions the sensor to a predetermined calibration point. The sensor may be disposed in a chamber in which the temperature is set to a predetermined value for all of the calibration points. The chamber 416 may be a Versa 10 type oven, as manufactured by Tenney Engineering Inc.

As mentioned above, the motor controller 410 controls the operation of the servomotor 412 and in turn the servo actuator 414 to drive the sensor to predetermined calibration angles. A positive voltage from the Continuing Conformance Tester 406 forces the servomotor 412 to move clockwise while a negative voltage moves the servomotor 412 counter-clockwise. The sensor voltage is read at each calibration point. After all of the calibration readings are taken the deviation between the values measured at the calibration points (i.e., the actual values) and the ideal values are determined for each position of the sensor. Compensation values are then written into the EEPROM 306.

As mentioned above, the Continuing Conformance Tester 406 is provided with a personal computer 418 (FIG. 23) which should include at least an 80486 DX or equivalent microprocessor. The Continuing Conformance Tester 418, in addition to the personal computer 418, may include a digital volt meter 420 for measuring the voltage of the sensor and the power supply 404 as well as a user-interface which includes a keyboard 422 and a monitor 424. The Continuing Performance Tester 406 may also include a tape back-up system 426 and a printer 428 as well as a status board 430 for providing an indication of the status of the system.

Figure 26:
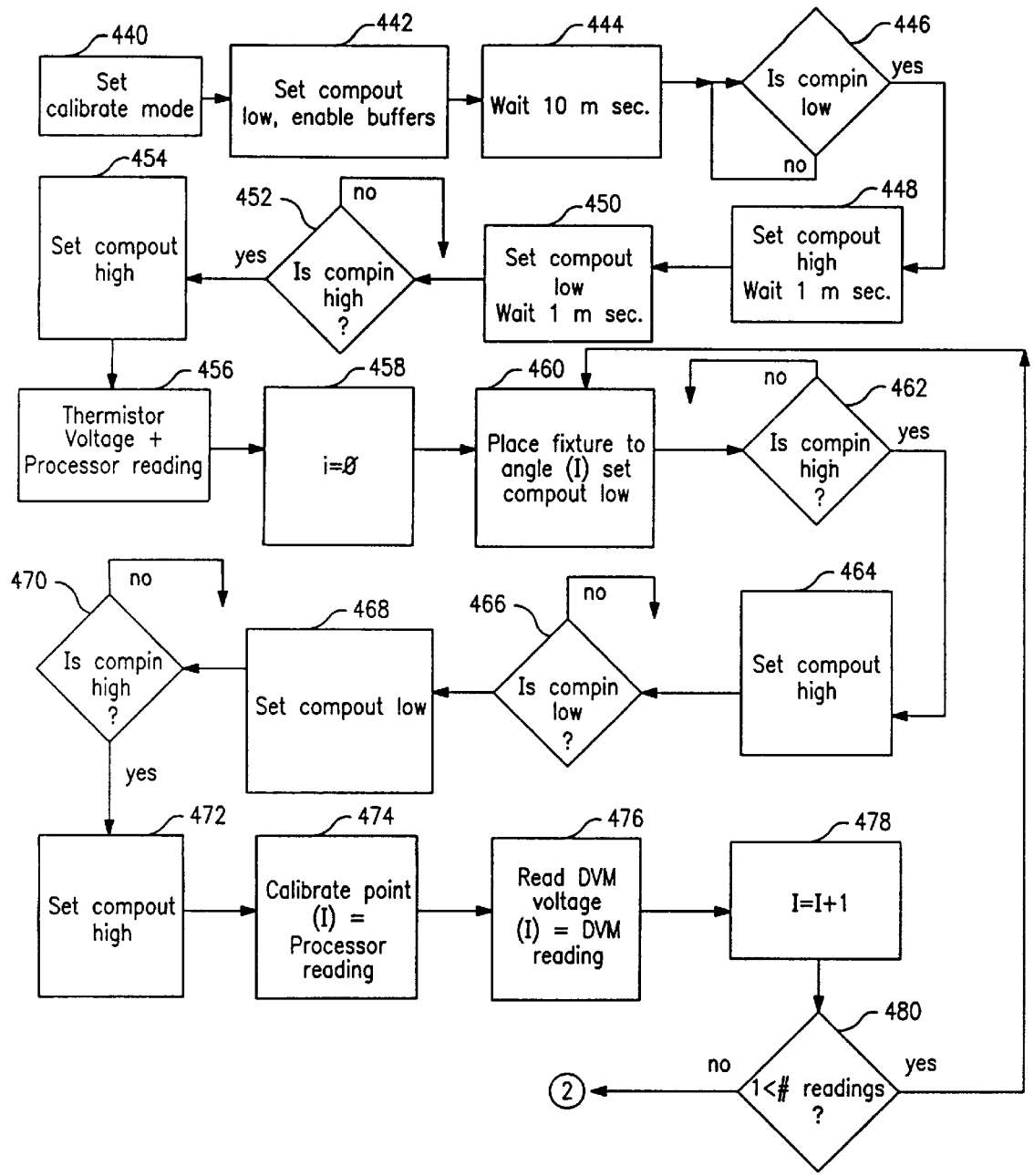
FIGS. 26 and 27 are flow charts of the software for the test equipment in accordance with the present invention.
Figure 27:
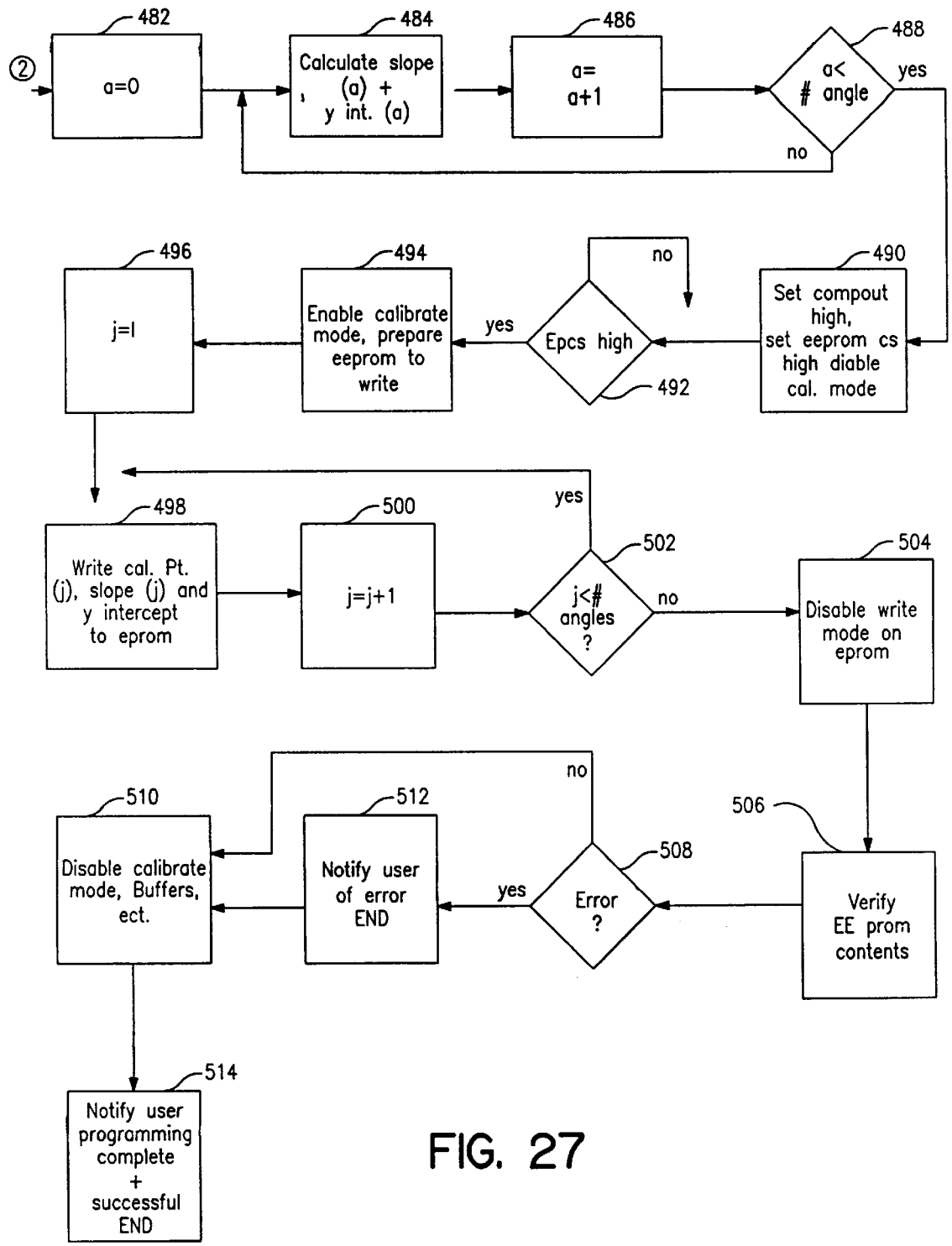

As mentioned above, the test equipment 402, illustrated in FIG. 22, is interfaced with the sensor electronics 300 by way of the test interface 310. As will be discussed in more detail below, the test equipment 402 including the personal computer 418 forming a portion of the Continuing Conformance Tester 406 is used to communicate with the microcontroller 304 in order to determine the compensation values for the sensor over a predetermined operating range. The software control for the personal computer 418 is illustrated in FIGS. 26 and 27. In addition, the source code for the personal computer 418 for determining the compensation values is set forth in the microfiche appendix, while the source code for the microcontroller 304 is set forth in the microfiche appendix.

Figures 24, 25:
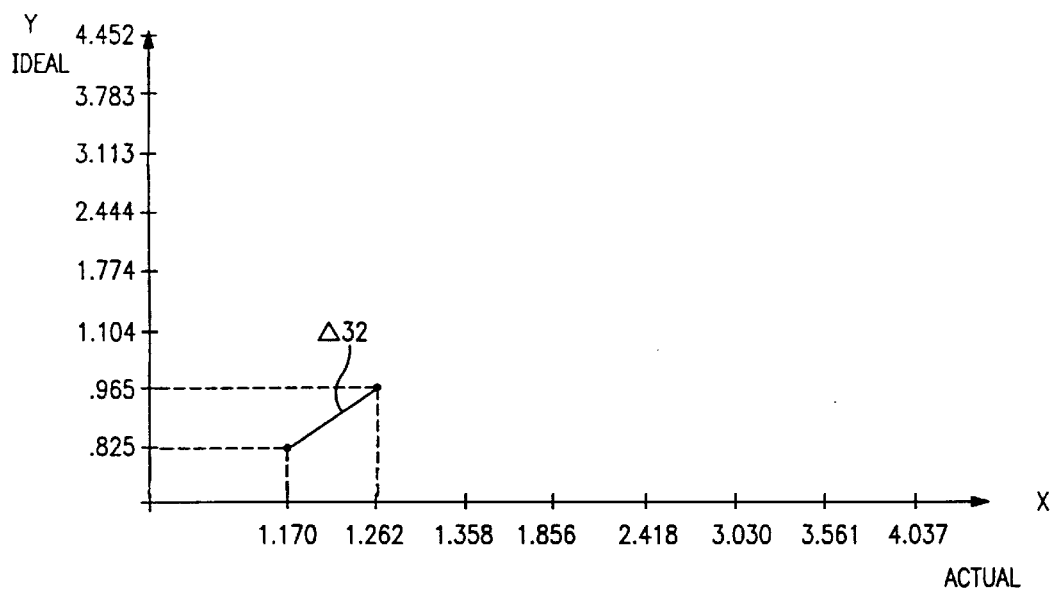
FIG. 24 is a table of exemplary values of measured and ideal values at a plurality of predetermined calibration values.
FIG. 25 is a graphical representation of the measured values as a function of ideal values illustrated in FIG. 24.

A key aspect of the invention is the method for determining the calibration values. As mentioned above the test equipment 402 positions the sensor 43 at various predetermined calibration points and determines the sensor output value at each of the points. These calibration points taken at a predetermined temperature, for example 25° C., are, in turn, compared with ideal values. The deviation between the actual values and the deviation values is used to develop a compensation value that is written to the EEPROM 306. The method for determining the compensation value is best understood with references to FIGS. 24 and 25. In particular, the output voltage of the sensor 43 is measured at a predetermined number of calibration angles. The calibration angles, as well as the other values illustrated in FIGS. 24 and 25, are exemplary. It is to be understood that virtually any number of calibration angles and values are within the present scope of the invention. Referring first to FIG. 24, the sensor output voltage is measured at 8 calibration angles $\theta_0-\theta_7$, which, for example, have been selected between 14.4° and 92.4° for discussion purposes. The particular calibration angles will vary as a function of the application of the sensor. The sensor output voltage at each of the calibration angles $\theta_0-\theta_7$ is measured and plotted along an X axis as shown in FIG. 25. The actual or measured values are then compared with the ideal values for each of the calibration angles $\theta_0-\theta_7$ which are plotted along a Y axis as shown in FIG. 25.

As discussed above, throughout the useful range of the sensor the output voltage of the sensor is assumed to be linear as illustrated in FIG. 19. Thus, between each of the calibration angles $\theta_0-\theta_7$ the response is assumed to be linear. As such the compensation values are determined by determining the slope m and y-intercept b of the line segments 432 (FIG. 25) for each of the calibration angles $\theta_0-\theta_7$. The slope m and y-intercept b between each of the calibration angles $\theta_0-\theta_7$ is determined and written to the EEPROM 306 in order to provide automatic compensation of the measured values by the analog input. In particular, the system measures actual values X of the sensor output. Since the ideal values are assumed to be linearly related to the actual values, the actual value is multiplied by the slope m and added with the y-intercept b to produce an ideal value. Since the slope m and y-intercept b compensation values vary between each calibration angle, the microcontroller 304 first determines the particular correction slope m and y-intercept b to be used. This is done by comparing the measured output voltages with the ideal voltage to determine the particular correction slope and y-intercept to be used. For example, referring to FIG. 24, assume that a value of 1.40 was measured by the sensor. The system would compare this measured value of 1.4 with the ideal values and ascertain that the calibration angle was between 20.4 and 34.8. In such a situation since the compensation values are assumed to be linear between successive predetermined calibration angles the slope compensation and y-intercept compensation values associated with the angle 20.4 would be used. Thus in such an example, the voltage of 1.4 volts would be multiplied (using the exemplary data illustrated in FIG. 24) by the value 1.448. The y-intercept b of −0.862 would be subtracted from that value to render an ideal voltage in that range.

Figure 28:
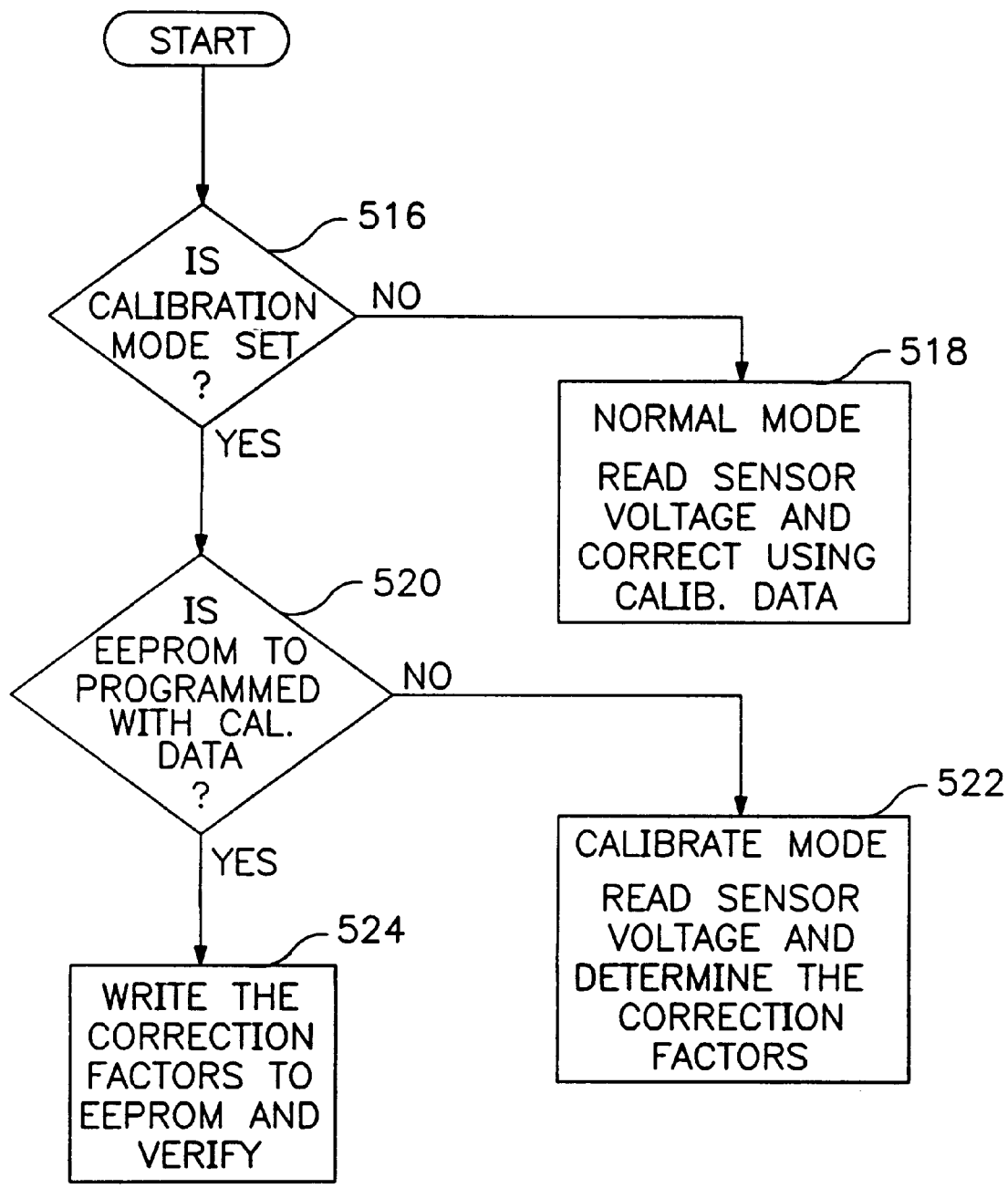
FIGS. 28–30 are flow charts of the software for the electronic circuitry in accordance with the present invention.
Figure 29:
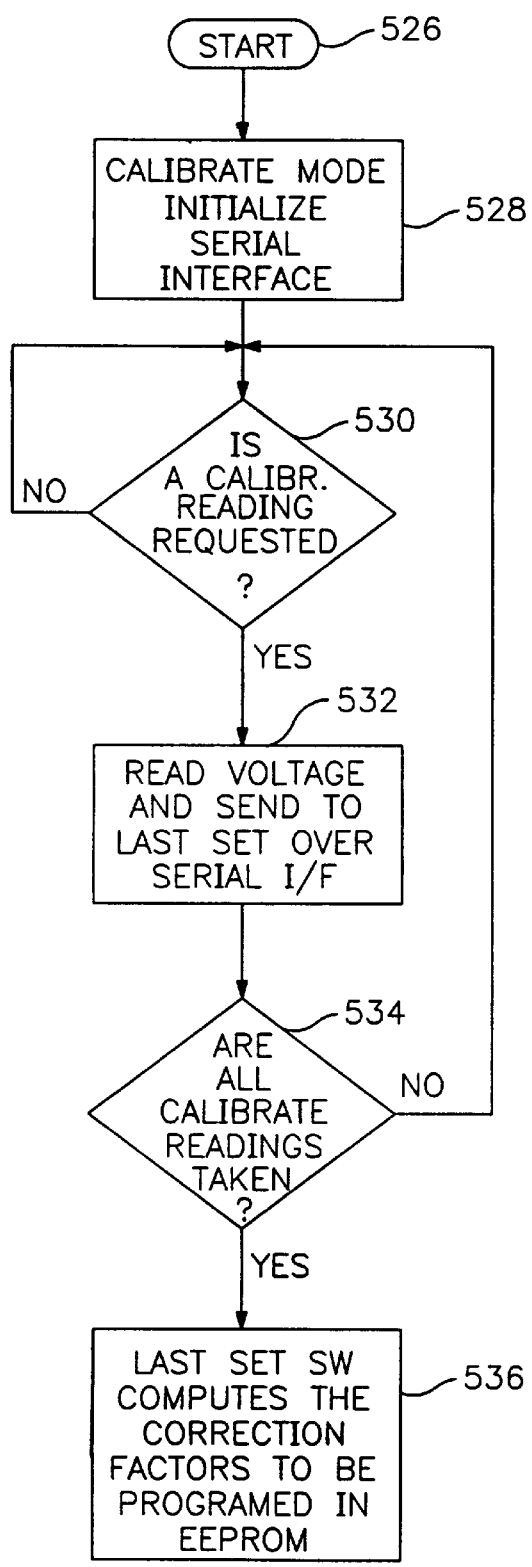

A flow chart for the test equipment 402 in particular the personal computer 418 for determining the compensation values is illustrated in FIGS. 26 and 27. A flow chart for providing a compensated output value for the Hall effect device by the microcontroller 34 is illustrated in FIGS. 28–30. Referring first to FIGS. 26 and 27, the system starts by setting the CALIBRATION mode and in particular, generating an active low CALIBRATE signal that is applied to the test interface 310 and in particular to the optical isolator 362 in step 440. Once the CALIBRATE mode is enabled, the test equipment 402 initiates a handshake with the microcontroller 304. In particular, in step 442, the COMPOUT signal is set low and the tristate device 400 is enabled in step 442 by setting the BUFEN1-TSET and BUFEN2_TSET signals. The COMPOUT signal is applied to the optical isolator 364 and indicates to the microcontroller 304 that the test equipment 402 is ready to initiate determination of the compensation values as discussed above. The enable signals for the tristate device 400 BUFEN1_TSET, and BUFEN2_TSET are applied to the 1G, 2G respectively pins of the tristate device 400. These signals are active low in order to enable the tristate device 400. After the COMPOUT signal is set low and the tristate device 400 is enabled, the system waits for a predetermined time period, for example, 10 milliseconds, in step 444 to determine if the microcontroller 304 is ready. After the 10 millisecond time period the system reads the COMPIN_TSET signal, available at the output of the optical isolator 372 as part of the handshake between the microcontroller 304 and the personal computer 418. If the COMPIN_TSET signal has not been set low, the system returns to Step 446 and awaits the handshake from the micro-controller 304. Once the COMPIN_PCB signal is pulled low by the microcontroller 304 the COMPIN_TSET signal is read by the personal computer 418 at the output of the optical isolator 372. If the COMPIN_TSET signal is low, the personal computer 418 sets the COMPOUT_TSET signal high in step 448 and waits for a predetermined time period, for example 1 millisecond. Subsequently, the personal computer 418 pulls the COMPOUT signal low in step 450 and waits 1 millisecond. Afterwards, the personal computer 418 checks the status of the COMPIN signal from the microcontroller 304. If the COMPIN signal is low the system recycles back to Step 450. Once the COMPIN signal is set high by the microcontroller 304 as ascertained in step 452 the personal computer 418 sets the COMPOUT signal high in step 454 to let the microcontroller 304 know that the handshake is complete. After the handshake is complete, the system proceeds to step 456 and reads the digitized sensor output voltage at the port bit PB[5] of the microcontroller 304 on the COMPIN line. In particular, the sensor output voltage is digitized by the ADC 302 under the control of the microcontroller 304. The digitized 12 bit value is made available at the port bit PB[5] one bit at a time and communicated serially to the PC 418 under the control of the clock signal EXCLK. In addition to measuring the sensor voltage in Step 456, the system also measures the thermistor voltage. In particular, while the digitized sensor voltage is being read, the microcontroller 304 configures the ADC 302 to digitize the analog signal on channel 0 (CH0). When the thermistor voltage is being read, the microcontroller 304 configures the ADC 302 to read the thermistor voltage on channel 1 CH1. After the digitized sensor voltage and thermistor voltage are read in step 456, the system starts cycling the sensor 413 through the predetermined calibration angles for example $\theta_0$–$\theta_7$ (FIG. 24). In particular, in steps 458 et seq., the system commands the test equipment 402 to position the sensor at each one of the calibration angles $\theta_0$–$\theta_7$. Initially for the first calibration angle $\theta_0$ the test equipment 402 is configured to place the sensor at angle $\theta_0$ in step 460 and to set the COMPOUT signal low. Subsequently in step 462 the system ascertains whether the microcontroller 304 has acknowledged that the Hall effect device is being calibrated at the initial calibration angle $\theta_0$ by determining whether the microcontroller 304 has pulled the COMPIN signal high. If not, the system loops back to step 462 and awaits for the COMPIN signal to be pulled high by the microcontroller 304. Once the COMPIN signal goes high the personal computer 418 sets the COMPOUT signal high in step 464. After the COMPOUT signal has been set for in step 464, the system awaits an acknowledgment by the microcontroller 304 by determining whether the COMPIN signal has been set low in step 466. If not, the system loops back to step 466 and awaits acknowledgment by the microcontroller 304. Once the COMPIN signal is set low, the personal computer 418 sets the COMPOUT signal low in step 468. After the COMPOUT signal is set low, the system awaits acknowledgment by the microcontroller 304 by determining whether the COMPIN line has been set high in step 470. If not, the system returns awaits the acknowledgment by the microcontroller 304 and returns to step 468. Once the microcontroller 304 acknowledges the personal computer 418 by setting its COMPIN signal high, the personal computer 418 sets its COMPOUT signal high in step 472. Subsequently in step 474 the actual sensor values are read in steps 474 and 476. For the first time through the loop I is set to zero and thereafter incremented in step 478. In step 480 the system determines whether I is less than the total number of readings required. As indicated above, eight exemplary readings may be taken at calibration angles $\theta_0$–$\theta_7$. If less than all of the readings have been taken the system proceeds to FIG. 27 and calculates the slope and intercept of the actual measurements versus the ideal values in steps 482, 484, 486 and 488 as discussed above. The steps 460 through 488 are cycled until the slopes m and y-intercepts b have been determined for all the calibration angles $\theta_0$–$\theta_7$. Once all of the calculations have been determined for a particular sensor, the system proceeds to step 490 in order to initiate writing of the compensation values to the EEPROM 306 (FIG. 20). In particular, in step 490 the COMPOUT signal is set high. This signal is tied to the data input DIN of the EEPROM 306 and is used to initiate a write to the EEPROM 306 in a manner as discussed above. In addition, the system selects the EEPROM 306 by setting the signal EPCS high, which, in turn, is tied to the chip select pin CS of the EEPROM 306. In addition, the CALIBRATE mode is disabled by pulling the CALIBRATE signal high. Subsequently in step 492, the system checks to determine if the chip select pin CS of the EEPROM 306 has been set, since this pin is also under the control of the microcontroller 304 and in particular the port bit PB[0]. If the EEPROM chip-select signal is not high, the system awaits in step 490 until the chip select signal for the EEPROM 306 is high. Once the chip select signal EPCS for the EEPROM 306 goes high, the CALIBRATE mode is enabled by pulling the CALIBRATE signal low in step 494. In addition, as discussed above, the EEPROM 306 is prepared for write. In steps 496, 498, 500 and 502 the system writes all of the calibration points, and, in particular, the slopes m and y-intercepts b for each of the calibration points $\theta_0$–$\theta_7$ to the EEPROM 306. As indicated above, communication to the EEPROM 306 is serial with bits being clocked in one bit at a time under the control of the clock signal EXCLK. After all the compensation values have been written to the EEPROM 306, the system disables the WRITE mode for the EEPROM 306 in step 504. After the WRITE mode for the EEPROM 306 has been disabled, the contents of the EEPROM 306 are verified in steps 506 and 508 for errors. If no errors are found in the contents of the EEPROM 306 the system proceeds to step 510 where the CALIBRATE mode is disabled as well as the buffer enable signals BUFEN1_TSET and BUFEN2_TSET to disable the tristate device 400, which, in essence, disconnects the test equipment 402 from the interface 310. If errors are detected in step 508, the user is notified of the errors by way of the monitor (FIG. 23) in step 512 with the system subsequently going to step 510. After the CALIBRATE mode and buffer enable signals are disabled, the tristate device 400 is disabled. The system proceeds to step 514 and prints a message on the monitor 424 that the programming of the EEPROM 306 is complete and was successful.

The flow charts for the microcontroller 304 are illustrated in FIGS. 28–30. Initially the system determines in step 516 whether the CALIBRATE mode of operation has been selected. If not, the system proceeds to step 518 and assumes a NORMAL mode is selected and executes the code illustrated in FIG. 30 for NORMAL mode. If the system is in a CALIBRATE mode as determined by reading the CALIBRATE signal applied to port bit PB[3] the microcontroller 304 system proceeds to step 520 and determines whether the compensation values need to be programmed into the EEPROM 306. If not, the system assumes a CALIBRATE mode and proceeds to step 522 and the software illustrated in FIG. 29. Otherwise, the correction factors are written to the EEPROM 306 and verified in step 524.

The CALIBRATE mode is initiated in step 526. Initially in step 528 the serial interface is initialized. After the serial interface is initialized the microcontroller 304 determines whether a reading is being requested in step 530. If not, the system waits at step 530 for such request. If a calibration reading has been requested the sensor voltage or thermistor voltage is read and sent to the test equipment 402 over the serial interface in step 532. The system next determines in step 534 whether all readings have been taken. If not, the system returns to step 530. If so, the system proceeds to step 536 and determines the correction values to be programmed to the EEPROM 306.

The NORMAL mode is illustrated in FIG. 30 and is initiated in step 538. Initially, in step 540 the system ascertains whether the system is in a NORMAL mode by monitoring the logic level of the CALIBRATE signal. If the CALIBRATE signal is high, a NORMAL mode is indicated and the sensor voltage is determined. After the sensor voltage is read, the proper correction factor from the EEPROM 306 is determined in step 542. Subsequently in step 544 the measured value is multiplied by the slope m correction factor in step 544. Next, in step 546, the y-intercept b is added to the result obtained from step 544. Lastly, in step 548 the adjusted output voltage is applied to the DAC 308 which in turn provides a corrected sensor output voltage $V_{OUT}$.

The system also provides for thermal compensation. As mentioned above, the compensation values are determined at a particular temperature, for example, 25° C. The readings provided by the thermistor 330, for example, a Yageo 1% metal film fixed resistor. The temperature compensation is accomplished by assuming, for example, −3% deviation at 150° C. in the output signal due to temperature when the sensor is hot and a +1% deviation at −40° C. in the output signal when the sensor is cold. Whether the sensor is hot or cold is determined by comparing the thermistor voltage Van with the thermistor voltage $V_{AMB}$ at the temperature at which the compensation values were taken. If the compensation values were determined at a 25° C. ambient, then $V_{AMB}$ is the thermistor voltage at 25° C. Thus, if the thermistor voltage $V_{THM}$>$V_{AMB}$, the system is assumed to be hot and a 3% tolerance is assumed. If the thermistor voltage $V_{THM}$<$V_{AMB}$, the system is assumed to be cold and a 1% tolerance is assumed. For a 5 volt system, it is assumed that at the null point voltage $V_{CROSSOVER}$ of the sensor (i.e. output voltage at which the output signal indicates 0 gauss), that there is no shift in the output voltage due to temperature deviation. The deviation is thus determined by the following equation:

$$DEV = +/-\left[\frac{V_{AMB} - V_{THM}}{V_{THM}} * \text{TOLERANCE} * (V_{MEASURED} - V_{CROSSOVER})\right]$$

If the system is hot, the deviation is added to the measured voltage. If the system is cold, the deviation is subtracted from the measured voltage.

The temperature tolerances as well as the thermistor voltage readings are linearized to provide a more accurate output. Also a resistor (not shown) of the same value as the thermistor may be connected in parallel with the thermistor. For a 3% total tolerance, the tolerance can be linearized by assuming the tolerance varies linearly over the 3% total tolerance range and the temperature range. Assuming the tolerance is in the general form of y=mx+b, for a 3% tolerance over a 125° C. temperature range (i.e. 150° C.–25° C.), the slope m will be 0.00024 and the y-intercept b will be −0.006.

In order to linearize the thermistor voltage $V_{THM}$ values, the voltages are read at the temperature extremes, 25° C. and 150° C. Assuming that $V_{THM}$ is in the general form y=mx+b, the slope and y-intercept b can be determined. For example at 25° C., $V_{THM}$ is 2.3832212 volts and at 150° C., $V_{THM}$= 0.1591433, the slope m will be −56.2031 and the y-intercept b will be 158.9444. Thus, the temperature will be equal to −56.2031 $V_{THM}$+158.944. For a 3% tolerance, the tolerance is equal to 0.00024*TEMP −0.006. Substituting the value for the temperature yields a tolerance of −0.03488744 $V_{THM}$+0.03214656. The tolerance is then substituted into the equation above for the deviation DEV in order to determine the amount of temperature compensation.

In a similar manner, the tolerance thermistor voltage $V_{THM}$ are linearized for a 1% tolerance. These values are then used to determine the deviation as discussed above.

SMART SENSOR CIRCUITRY-DIGITAL OUTPUT

As mentioned above, the automatic electronic compensation circuitry discussed in connection with FIGS. 18–30 above is adapted to be utilized with virtually any displacement type sensor which measures linear displacement and provides a compensated analog output signal. The concept discussed above in connection with FIGS. 18–30 can be extended to electronic circuitry which provides a digital output. In such an application, the digital to analog converter 308 (FIG. 18) is simply removed and a digital output from the microprocessor 304 is utilized. The output signal from the microprocessor 304 may be used directly or to control a line driver depending on the system requirements. As shown in FIG. 20, the interface between the DAC 308 and the microprocessor 304 is three wire interface. In order to maintain the three wire interface, with the DAC 308 removed, asynchronous communications may be used. The protocol for the asynchronous serial communication may be as illustrated in FIG. 31. As shown in FIG. 31, a start bit (i.e. a logical zero) and a stop bit, for example, two data bit periods of logical one, are used with the data transmitted as twelve bit serial data D[0–11] therebetween. The source code for such an embodiment is provided in the microfiche appendix.

While the invention has been described with reference to details of the embodiments shown in the drawings, these details are not intended to limit the scope of the invention as described in the appended claims.

What is claimed and desired to be secured by Letters Patent of the United States is:

1. An electronic circuit for automatically compensating for errors in an output signal of a predetermined displacement sensor, the electronic circuitry comprising:

means for receiving sensor output signals;

a non-volatile memory for storing compensation values, said compensation values including at least one predetermined first slope value and at least one predetermined second value; and means for automatically and linearly compensating said output signals to automatically compensate for errors and generating compensated sensor output signals, said compensating means including means for compensating said sensor output signals by multiplying said sensor output signals by said at least one predetermined first value defining a product and adding said at least one predetermined second value to said product to compensate the sensitivity as well as the offset of said sensor output signals so that the compensated output signals are linear within a predetermined range of the sensor.

2. The electronic circuit as recited in claim 1, wherein said compensating means includes means for automatically compensating for errors in the output signal resulting from temperature deviations.

3. The electronic circuit as recited in claim 1, wherein said compensating means includes means for automatically compensating for errors due in part to part variations of the sensor.

4. The electronic circuit as recited in claim 1, wherein said sensor is a linear sensor.

5. The electronic circuit as recited in claim 4, wherein said sensor output signal is from a Hall effect sensor.

6. The electronic circuit as recited in claim 1, wherein said compensated sensor output signal is a digital signal.

7. The electronic circuit as recited in claim 1, wherein said compensated sensor output signal is an analog signal.

8. The electronic circuit as recited in claim 1, wherein said non volatile memory is a EEPROM.

9. The electronic circuit as recited in claim 1, wherein said electronic circuit is formed on-chip with said sensor.

10. The electronic circuit as recited in claim 1, wherein said electronic circuit is formed off-chip relative to said sensor.

11. The electronic circuit as recited in claim 1, wherein said sensor is a rotary sensor.

\* \* \* \* \*